United States Patent
Bottomley et al.

(10) Patent No.: US 6,801,565 B1
(45) Date of Patent: Oct. 5, 2004

(54) MULTI-STAGE RAKE COMBINING METHODS AND APPARATUS

(75) Inventors: Gregory Edward Bottomley, Cary, NC (US); Yi-Pin Eric Wang, Cary, NC (US); Tony Ottosson, Morrisville, NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/344,898

(22) Filed: Jun. 25, 1999

(51) Int. Cl.[7] .............................................. H04B 1/707
(52) U.S. Cl. ........................ 375/148; 375/150; 375/347
(58) Field of Search .................................. 375/142, 144, 375/148, 150, 347, 349

(56) References Cited

U.S. PATENT DOCUMENTS

| | | | |
|---|---|---|---|
| 5,574,747 A | 11/1996 | Lomp | 375/200 |
| 5,615,209 A | 3/1997 | Bottomley | 370/342 |
| 5,809,020 A | 9/1998 | Bruckert et al. | 370/335 |
| 5,812,542 A | 9/1998 | Bruckert et al. | 370/335 |
| 6,157,687 A * | 12/2000 | Ono | 375/347 |
| 6,192,066 B1 | 2/2001 | Asanuma | 375/130 |
| 6,208,683 B1 | 3/2001 | Mizuguchi et al. | 375/140 |
| 6,301,293 B1 * | 10/2001 | Huang et al. | 375/130 |
| 6,370,183 B1 | 4/2002 | Newson et al. | 375/144 |

FOREIGN PATENT DOCUMENTS

| | | |
|---|---|---|
| EP | 0 825 727 A1 | 2/1998 |
| EP | 0 893 888 A2 | 1/1999 |
| EP | 0 898 383 A2 | 2/1999 |

OTHER PUBLICATIONS

International Search Report, PCT/US00/12670, Sep. 1, 2000.

Adachi et al., "Wideband DS–CDMA for Next–Generation Mobile Communications Systems," IEEE Communications Magazine, Sep., 1998, pp. 56–69.

Barbosa et al., "Adaptive Detection of DS/CDMA Signals in Fading Channels," IEEE Trans. Commun., vol. 46, pp. 115–124, Jan. 1998.

Bottomley et al., "Adaptive Arrays and MLSE Equalization," Proc. 1995 IEEE 45th Vehicular Technology Conference (VTC '95), Chicago, Jul. 25–28, 1995, 5 pgs.

Dahlman et al., "UMTS/IMT–2000 Based on Widebadn CDMA," IEEE Communications Magazine, Sep. 1998, pp. 70–80.

(List continued on next page.)

*Primary Examiner*—Stephen Chin
*Assistant Examiner*—Kevin Kim
(74) *Attorney, Agent, or Firm*—Myers Bigel Sibley & Sajovec

(57) ABSTRACT

Information encoded in a spread spectrum signal transmitted in a communications medium is recovered. A composite signal including a spread spectrum signal is received from the communications medium, and correlated with a spreading sequence to generate time-offset correlations. Respective first and second groups of the correlations are combined, e.g., according to estimated channel coefficients, to produce respective first and second combined values. The first and second combined values are then combined in a manner that compensates for correlated impairment in the composite signal to generate an estimate information in the transmitted spread spectrum signal, e.g., using weighting factors generated from an estimated composite channel response and an estimated impairment correlation, or adaptively generated weighting factors. Related apparatus are also described.

46 Claims, 10 Drawing Sheets

OTHER PUBLICATIONS

Dent et al., "CDMA–IC: A Novel Code Division Mulltiple Access Scheme Based on Interference Cancellation," in Proc. PIMRC, Boston, Massachusetts, pp. 4.1.1–4.1.5, Oct. 1992.

Dinan et al., "Spreading Codes for Direct Sequence CDMA and Wideband CDMA Cellular Networks," IEEE Communications Magazine, Sep. 1998, pp. 48–54.

Duel–Hallen et al., "Multiuser Detection of CDMA Systems," IEEE Personal Commun. Mag., vol. 2, pp. 46–58, Apr. 1995.

Ewerbring et al., "CDMA with Interference Cancellation: A Technique for High Capacity Wireless Systems," in Proc. IEEE Int. Conf. Commun., Geneva, Switzerland, 1993.

Gumas, "A Century Old, the Fast Hadamard Transform Proves Useful in Digital Communications," Personal Engineering, Nov. 1997, pp. 57–63.

Hottinen et al., "Multi–User Detection for Multi–Rate CDMA Communications," in Proc. IEEE Int. Conf. Commun., Dallas, Texas, Jun. 24–28, 1996.

Juntti, M.J., "Multi–User Detector Performance Comparisions in Multi–Rate CDMA Systems," in Proc. IEEE VTC '98, pp. 31–35, Ottawa, Canada, May 1998.

Juntti, M.J., "System Concept Comparisons for Multi–Rate CDMA with Multi–User Detection," in Proc. IEEE VTC '98, pp. 36–40, Ottawa, Canada, May 1998.

Kohno et al., "Combination of an Adaptive Array Antenna and a Canceller of Interference for Direct–Sequence Spread– Spectrum Multiple–Access System," IEEE Journal on Selected Areas in Communication, vol. 8, No. 4, May 1990.

Liu et al., "Blind Equalization in Antenna Array CDMA Systems," IEEE Trans. Sig. Proc., vol. 45, pp. 161–172, Jan. 1997.

Madhow et al., "MMSE Interference Suppression for Direct–Sequence Spread–Spectrum Communication," IEEE Trans. Commun., vol. 42, pp. 3178–3188, Dec. 1994.

Madkour et al., "Multi–Rate Multi–Code CDMA Using FWT for Mobile and Personal Communications," in Proceedings of The Ninth IEEE International Symposium on Personal, Indoor and Mobile Radio Communications, The Marriott Copley Place, Boston, Massachusetts, Sep. 8–11, 1998.

Mailaender et al., "Linear Single–User Detectors for Asynchronous and Quasi–Synchronous CDMA," in Proc. $29^{th}$ Annual Conf. on Info. Sciences and Systems (CISS '95), Johns Hopkins University, pp. 199–204, 1995.

Muszynski, P., "Interference Rejection Rake–Combining for WCDMA," First Intl. Symposium on Wireless Personal Multimedia Communications (WPMC '98). Yokosuka, Japan, pp. 93–98, Nov. 4–6, 1998.

Naguib et al., "Performance of CDMA Cellular Networks with Base–Station Antenna Arrays," Presented at the 1994 International Zurich Seminar on Digital Communications (no date).

Ng et al., "A Structured Channel Estimator for Maximum–Likelihood Sequence Detection," IEEE Commun. Letters, vol. 1, pp. 52–55, Mar. 1997.

Ojanpera et al., "Qualitative Comparison of Some Multi–User Detector Algorithms for Wideband CDMA," in Proc. IEEE VTC '98, pp. 46–50, Ottawa, Canada, May 1998.

Patel et al., "Analysis of a DS/CDMA Successive Interference Cancellation Scheme in DS/CDMA System Using Correlations," in Proc. Globecom, Houston, Texas, pp. 76–80, 1993.

Patel et al., "Analysis of a Simple Successive Interference Cancellation Scheme in DS/CDMA System," IEEE JSAC, vol. 12, No. 5, pp. 796–807, Jun. 1994.

Pateros et al., "An Adaptive Correlator Receiver for Direct–Sequence–Spread–Spectrum Communication," IEEE Trans. C ommun., vol. 44, pp. 1543–1552, Nov. 1996.

Peterson et al., "Introduction to Spread–Spectrum Communications," Prentice Hall International, Inc., pp. 540–547, 1995.

Picinbono, B., "On Circularity," IEEE Trans. Sig. Proc., vol. 42, pp. 3473–3482, Dec. 1994.

Picinbono, B., "Second–Order Complex Random Vectors and Normal Distributions," IEEE Trans. Sig. Proc., vol. 44, pp. 2637–2640, Oct. 1996.

Wang et al., "Blind Multi–User Detection: A Subspace Approach," IEEE Trans. Info. Theory, vol. 44, No. 2, pp. 677–690, Mar. 1998.

Monk et al., "A Noise Whitening Approach to Mulitple Access Noise Rejection–Part I: Theory and Background," IEEE Journal on Selected Areas in Communications, vol. 12, Jun. 1994, pp. 817–827.

Monk et al., "A Noise Whitening Approach to Multiple–Acess Noise Rejection–Part II: Implementation Issues," IEEE Journal on Selected Areas in Communications, vol. 14, Oct. 1996, pp. 1488–1499.

Klein, Data Detection Algorithms Specifically Designed for the Downlink of CDMA Mobile Radio Systems, *1997 IEEE Vehicular Technology Conference*, Phoenix, AZ, May 4–7, 1997.

Bottomley, "Optimizing the Rake Receiver for Demodulation of Downlink CDMA Signals," *Proceedings of the $43^{rd}$ IEEE Vehicular Technology Conference*, Secaucus, NJ, May 18–20, 1993.

Jamal et al., "Adaptive MLSE Performance on the D–AMPS 1900 Channel," *IEEE Transactions on Vehicular Technology*, vol. 46, Aug. 1997, pp. 634–641.

Harris et al. "Handbook of Mathematics and Computer Science," published by Springer–Verlag, New York, 1998, pp. 456–457.

Yoon et al., "A Spread–Spectrum Multiaccess System with Cochannel Interference Cancellation for Multipath Fading Channels," IEEE J. Select. Areas Commun., vol. 11, No. 7, pp. 1067–1075, Sep. 1993.

Yoon et al., "Matched Filtering in Improper Complex Noise and Applications to DS–CMDA," Sixth IEEE Intl. Symp. Personal, Indoor, Mobile Radio Commun. (PIMRC '), Toronto, Sep. 27–29, 1995.

Yoon et al., "Matched Fitlers with Interferece Suppression Capabilities for DS–CDMA," IEEE J. Sel. Areas Commun., vol. 14, pp. 1510–5121, Oct. 1996.

Yoon et al., "Maximizing SNR in Improper Complex Noise and Applications to CDMA," IEEE Commun. Letters, vol. 1, pp. 5–8, Jan. 1997.

Zvonar et al., "Sub–Optimal Multi–User Detector for Frequency Selective Rayleigh Fading Synchronous CDMA Channels," IEEE Trans. Commun., vol. 43, No. 2/3/4, pp. 154–157, Feb./Mar./Apr. 1995.

International Search Report, PCT/US00/12757, Sep. 4, 2000.

* cited by examiner

MULTI-STAGE RAKE COMBINING METHODS AND APPARATUS

CROSS-REFERENCE TO RELATED APPLICATION

This application is related to application Ser. No. 09/344,899, filed concurrently herewith, entitled Rake Combining Methods and Apparatus Using Weighting Factors Derived from Knowledge of Spread Spectrum Signal Characteristics, to Wang et al., assigned to the assignee of the present application. The disclosure of this application is hereby incorporated herein by reference.

FIELD OF THE INVENTION

The present invention relates to communications methods and apparatus, and more particularly, to spread spectrum communications methods and apparatus.

BACKGROUND OF THE INVENTION

Wireless communications systems are commonly employed to provide voice and data communications to subscribers. For example, analog cellular radiotelephone systems, such as those designated AMPS, FTACS, NMT-450, and NMT-900, have long been deployed successfully throughout the world. Digital cellular radiotelephone systems such as those conforming to the North American standard IS-54 and the European standard GSM have been in service since the early 1990's. More recently, a wide variety of wireless digital services broadly labeled as PCS (Personal Communications Services) have been introduced, including advanced digital cellular systems conforming to standards such as IS-136 and IS-95, lower-power systems such as DECT (Digital Enhanced Cordless Telephone) and data communications services such as CDPD (Cellular Digital Packet Data). These and other systems are described in *The Mobile Communications Handbook*, edited by Gibson and published by CRC Press (1996).

FIG. 1 illustrates a typical terrestrial cellular radiotelephone communication system 20. The cellular radiotelephone system 20 may include one or more radiotelephones (terminals) 22, communicating with a plurality of cells 24 served by base stations 26 and a mobile telephone switching office (MTSO) 28. Although only three cells 24 are shown in FIG. 1, a typical cellular network may include hundreds of cells, may include more than one MTSO, and may serve thousands of radiotelephones.

The cells 24 generally serve as nodes in the communication system 20, from which links are established between radiotelephones 22 and the MTSO 28, by way of the base stations 26 serving the cells 24. Each cell 24 will have allocated to it one or more dedicated control channels and one or more traffic channels. A control channel is a dedicated channel used for transmitting cell identification and paging information. The traffic channels carry the voice and data information. Through the cellular network 20, a duplex radio communication link may be effected between two mobile terminals 22 or between a mobile terminal 22 and a landline telephone user 32 through a public switched telephone network (PSTN) 34. The function of a base station 26 is to handle radio communication between a cell 24 and mobile terminals 22. In this capacity, a base station 26 functions as a relay station for data and voice signals.

As illustrated in FIG. 2, a satellite 42 may be employed to perform similar functions to those performed by a conventional terrestrial base station, for example, to serve areas in which population is sparsely distributed or which have rugged topography that tends to make conventional landline telephone or terrestrial cellular telephone infrastructure technically or economically impractical. A satellite radiotelephone system 40 typically includes one or more satellites 42 that serve as relays or transponders between one or more earth stations 44 and terminals 23. The satellite conveys radiotelephone communications over duplex links 46 to terminals 23 and an earth station 44. The earth station 44 may in turn be connected to a public switched telephone network 34, allowing communications between satellite radiotelephones, and communications between satellite radio telephones and conventional terrestrial cellular radiotelephones or landline telephones. The satellite radiotelephone system 40 may utilize a single antenna beam covering the entire area served by the system, or, as shown, the satellite may be designed such that it produces multiple minimally-overlapping beams 48, each serving distinct geographical coverage areas 50 in the system's service region. The coverage areas 50 serve a similar function to the cells 24 of the terrestrial cellular system 20 of FIG. 1.

Several types of access techniques are conventionally used to provide wireless services to users of wireless systems such as those illustrated in FIGS. 1 and 2. Traditional analog cellular systems generally employ a system referred to as frequency division multiple access (FDMA) to create communications channels, wherein discrete frequency bands serve as channels over which cellular terminals communicate with cellular base stations. Typically, these bands are reused in geographically separated cells in order to increase system capacity.

Modem digital wireless systems typically utilize different multiple access techniques such as time division multiple access (TDMA) and/or code division multiple access (CDMA) to provide increased spectral efficiency. In TDMA systems, such as those conforming to the GSM or IS-136 standards, carriers are divided into sequential time slots that are assigned to multiple channels such that a plurality of channels may be multiplexed on a single carrier. CDMA systems, such as those conforming to the IS-95 standard, achieve increased channel capacity by using "spread spectrum" techniques wherein a channel is defined by modulating a data-modulated carrier signal by a unique spreading code, i.e., a code that spreads an original data-modulated carrier over a wide portion of the frequency spectrum in which the communications system operates.

Conventional spread-spectrum CDMA communications systems commonly use so-called "direct sequence" spread spectrum modulation. In direct sequence modulation, a data-modulated carrier is directly modulated by a spreading code or sequence before being amplified by a power amplifier and transmitted over a communications medium, e.g., an air interface. The spreading code typically includes a sequence of "chips" occurring at a chip rate that typically is much higher than the bit rate of the data being transmitted.

Typical transmit operations of such a system are illustrated in FIG. 3. Data streams from different users are subjected to various signal processing steps, such as error correction coding or interleaving, and spread using a combination of a user specific spreading code and a group-specific scrambling code. The coded data streams from the users are then combined, subjected to carrier modulation and transmitted as a composite signal in a communications medium.

A so-called RAKE receiver structure is commonly used to recover information corresponding to one of the user data streams. In a typical RAKE receiver, a received composite signal is typically correlated with a particular spreading sequence assigned to the receiver to produce a plurality of time-offset correlations, a respective one of which corresponds to an echo of a transmitted spread spectrum signal. The correlations are then combined in a weighted fashion, i.e., respective correlations are multiplied by respective weighting factors and then summed to produce a decision statistic. The performance of CDMA systems generally is limited by interference among different user signals. Spreading/despreading provides a degree of interference suppression, but the number of users is generally limited by interference.

Conventional RAKE reception techniques generally treat interference as white noise. More recently proposed techniques provide for a degree of interference cancellation through "whitening" of interference. Examples of such techniques are described in "A Noise Whitening Approach to Multiple Access Noise Rejection-Part I: Theory and Background," by Monk et al., *IEEE Journal on Selected Areas in Communications*, vol. 12, pp., 817–827(June 1994); "A Noise Whitening Approach to Multiple Access Noise Rejection-Part II: Implementation Issues," by Monk et al., *IEEE Journal on Selected Areas in Communications*, vol. 14, pp. 1488–1499 (October 1996); "Data Detection Algorithms Specifically Designed for the Downlink of CDMA Mobile Radio Systems," by Klein, 1997 IEEE Vehicular Technology Conference, Phoenix Ariz. (May 4–7, 1997); U.S. Pat. No. 5,572,552 to Dent et al. (issued Nov. 5, 1996); and "Optimizing the Rake Receiver for Demodulation of Downlink CDMA Signals," by Bottomley, *Proceedings of the 43$^{rd}$ IEEE Vehicular Technology Conference*, Secaucus N.J. (May 18–20, 1993).

Unfortunately, these approaches can be highly complex and difficult to implement in a practical receiver. Whitening approaches tend to provide dramatic gains when the number of RAKE fingers greatly exceeds the number of resolvable multipaths in a received signal, and thus a complex receiver design may be needed in order to obtain performance gains offered by such approaches. This complexity can be amplified in soft-handoff situations, in which a terminal is simultaneously receiving signals from multiple base stations. In addition, wide bandwidth next-generation CDMA systems, such as wideband CDMA (WCDMA) and cdma2000, may require even more complex receiver designs due to increased numbers of multipaths.

SUMMARY OF THE INVENTION

In light of the foregoing, it is an object of the present invention to provide improved methods and apparatus for recovering information represented by a spread spectrum signal transmitted in a communications medium.

It is another object of the present invention to provide improved methods and apparatus for recovering information represented by a spread spectrum signal that can compensate for interference from other spread spectrum signals transmitted in the communications medium.

It is another object of the present invention to provide improved methods and apparatus for recovering information from spread spectrum signals that can be implemented using less complex receiver operations and architectures than conventional interference suppression techniques.

These and other objects, features and advantages can be provided, according to the present invention, by methods and apparatus in which a composite signal including a spread spectrum signal is correlated with a desired spreading sequence, and the resulting correlations are subjected to a multistage combining process in which respective groups of correlations are combined to produced intermediate combined values that are subsequently combined in a manner that compensates for correlated impairment in the composite signal. The first stage of combining preferably is a traditional RAKE combining process in which correlations are combined according to channel estimates. The second stage of combining may use a number of different techniques for canceling multiuser interference and other correlated impairment, including explicit computational techniques, interference rejection combining (IRC), or adaptive techniques. Using a multistage approach allows the number of finger elements combined in more complex interference-canceling combining operations to be reduced, thus offering a potential reduction in complexity. The multistage approach also lends itself to hybrid combining techniques.

In particular, according to aspects of the present invention, information encoded in a spread spectrum signal transmitted in a communications medium is recovered. A composite signal including a spread spectrum signal is received from the communications medium, and correlated with a spreading sequence to generate time-offset correlations. Respective first and second groups of the correlations are combined, e.g., according to estimated channel coefficients, to produce respective first and second combined values. The first and second combined values are then combined in a manner that compensates for correlated impairment in the composite signal to generate an estimate information in the transmitted spread spectrum signal.

According to an embodiment of the present invention, the first and second combined values are combined based on an estimated impairment correlation and on a composite channel response that reflects the preceding combining operations. The composite channel response and impairment correlation may be estimated and used to generate weighting factors that are used to combine the first and second combined values. The weighting factors may also be iteratively generated from an estimated composite channel response, an estimated impairment correlation, and previously determined weighting factors. According to another embodiment of the present invention, the first and second combined values are combined according to weighting factors that are adaptively estimated based on a comparison of combined values generated by the second combining stage to a reference value, such as a pilot symbol value or a decoded symbol value.

According to another aspect of the present invention, an apparatus for recovering information encoded in a spread spectrum signal included in a composite signal includes a correlation unit operative to correlate the composite signal with a spreading sequence to generate time-offset correlations. A multistage combiner is responsive to the correlation unit and operative to combine respective groups of the correlations to provide respective intermediate combined values, and to combine the intermediate combined values in a manner that compensates for correlated impairment in the composite signal to estimate information in the transmitted spread spectrum signal.

According to one embodiment of the present invention, the multistage combiner includes a first combiner responsive to the correlation unit and operative to combine a first group of the correlations to produce a first combined value. A second combiner is responsive to the correlation unit and operative to combine a second group of the correlations to produce a second combined value. A third combiner is responsive to the first combiner and to the second combiner and operative to combine the first and second combined values in a manner that compensates for correlated impairment in the composite signal to generate an estimate of information in the transmitted spread spectrum signal.

The first and second combiners may combine the first and second groups of correlations in a manner that compensates for effect of a channel over which the spread spectrum signal is received, e.g., using channel coefficient estimates. The third combiner may be operative to combine the first and second values based on an estimated impairment correlation and on a composite channel response that reflects effects of the first and second combiners, e.g., using weighting factors determined from an estimated composite channel response and an estimated impairment correlation. Alternatively, the third combiner may combine the first and second values according to adaptively estimated weighting factors.

DETAILED DESCRIPTION OF PREFERRED EMBODIMENTS

Figure 1:
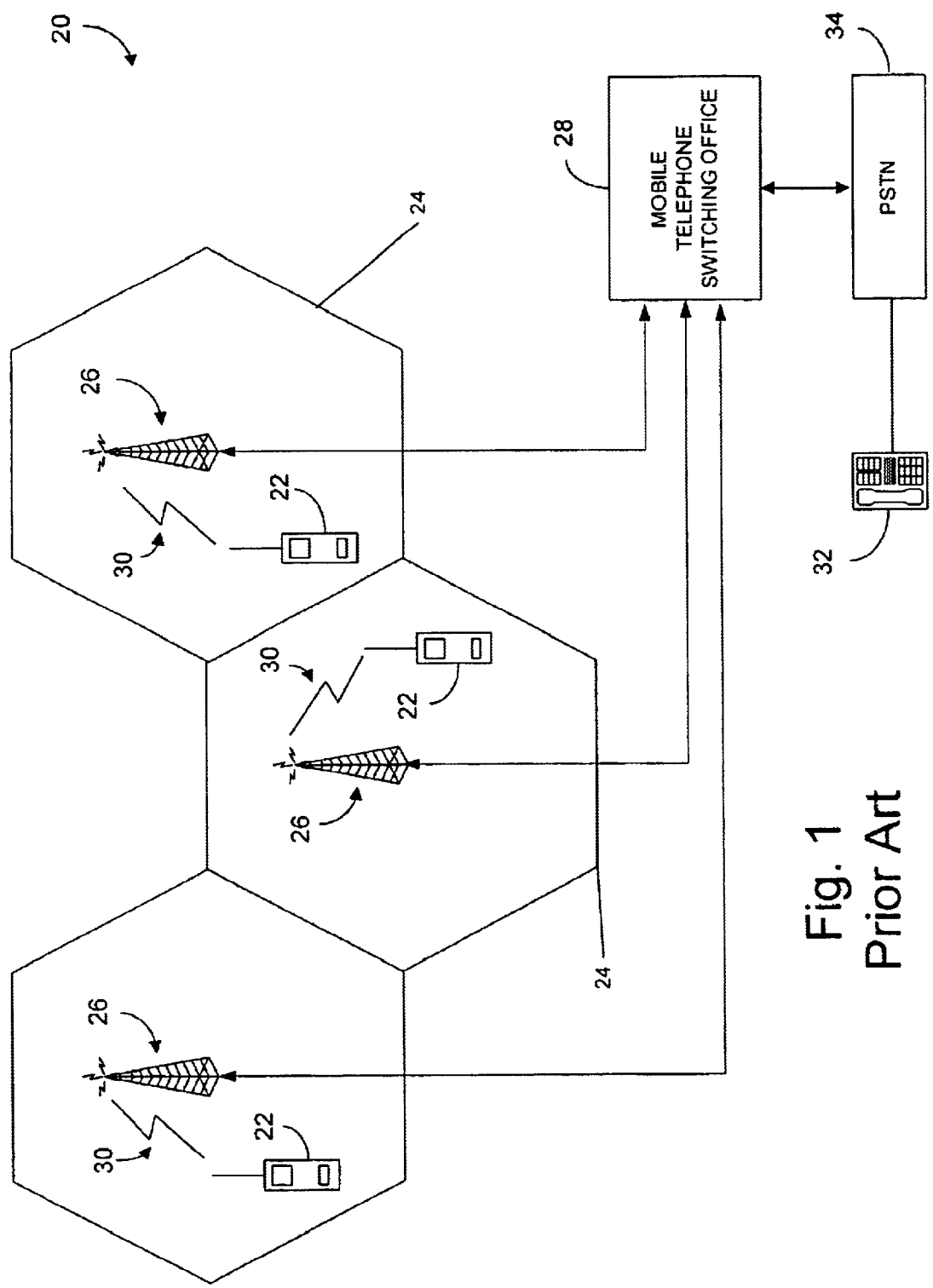
FIG. 1 is a schematic diagram illustrating a conventional terrestrial cellular communications system.
Figure 2:
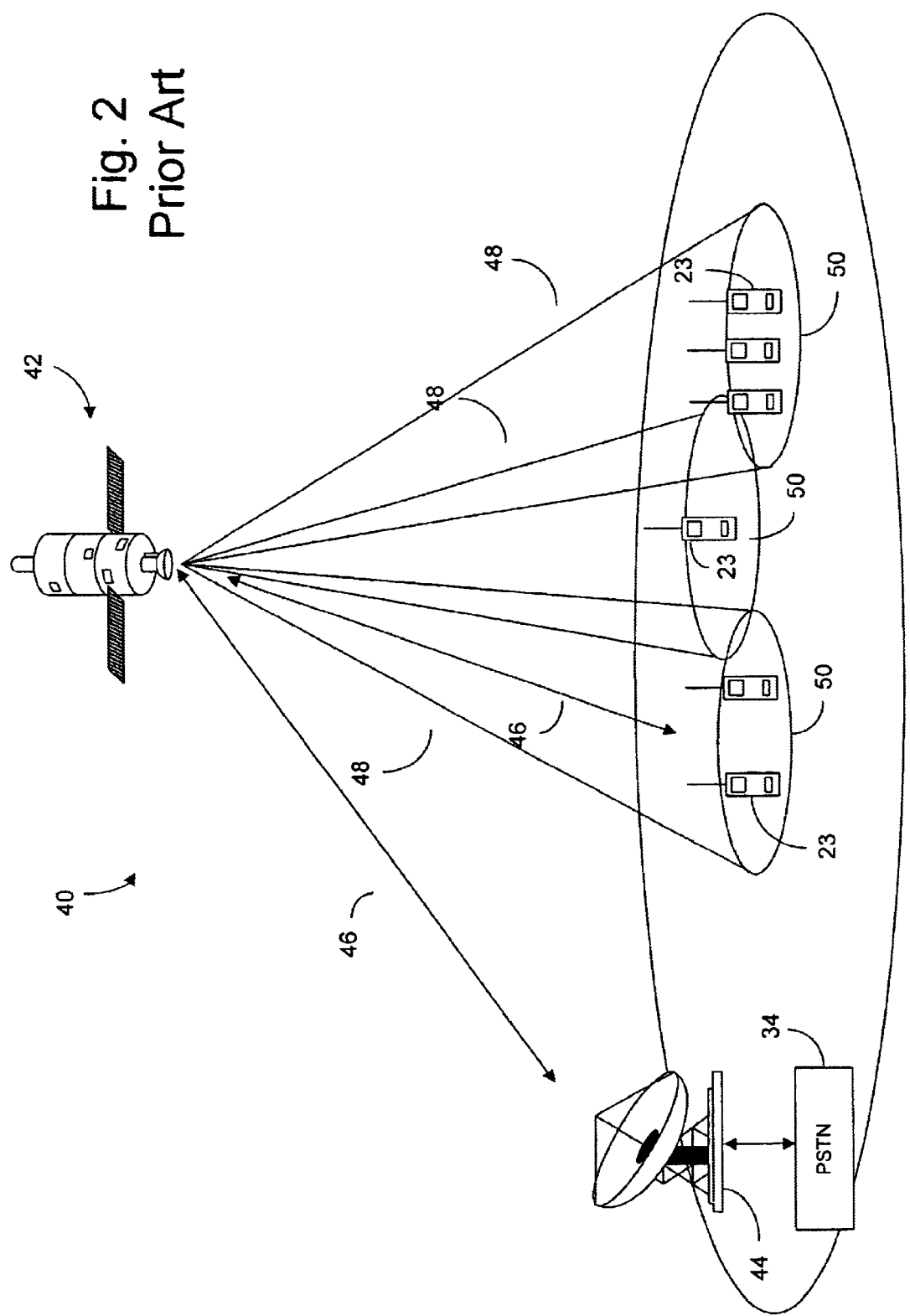
FIG. 2 is a schematic diagram illustrating a conventional satellite based wireless communications system.
Figure 3:
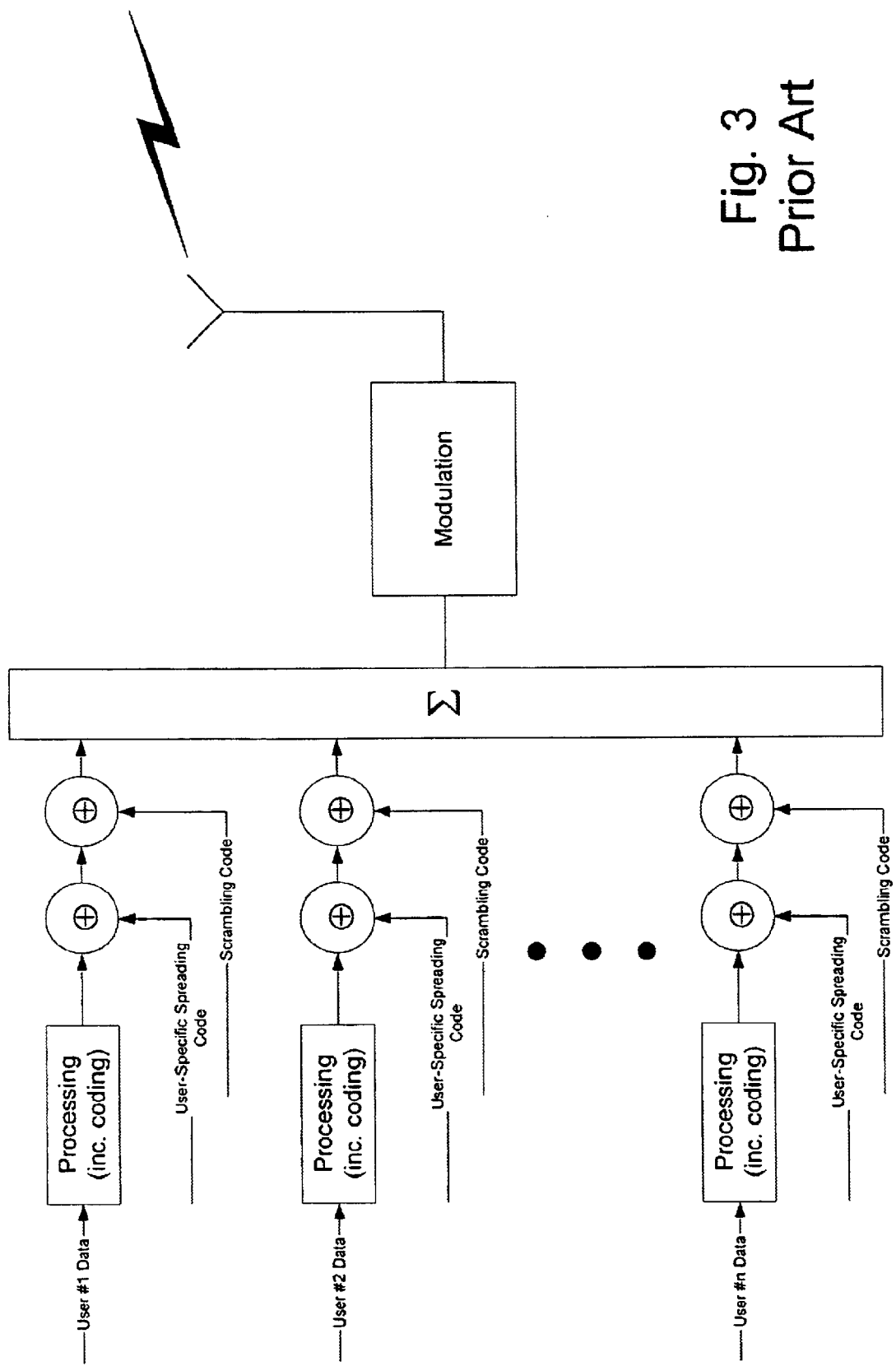
FIG. 3 is a schematic diagram illustrating a conventional wireless base station.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like numbers refer to like elements.

The discussion herein relates to wireless communications systems, and more particularly, to wireless code division multiple access (CDMA) systems, for example, systems conforming to the IS-95 standards or to proposed standards for wideband CDMA (WCDMA, CDMA2000, and the like). In such wireless communications systems, one or more antennas radiate electromagnetic waveforms generated by a transmitter located, for example, in a mobile terminal or base station. The waveforms are propagated in a radio propagation environment, and are received by a receiver via one or more antennas. It will be understood that although the description herein refers to a radio environment, apparatus and methods are applicable to other environments, such as wireline communications and recovery of data from magnetic storage media.

The present invention arises from the realization that interference suppression can be achieved with reduced complexity by using multiple combining stages. In an embodiment of the present invention, groups of correlations are combined according to channel coefficients to produce combined values. The combined values are then combined again in a manner that provides interference suppression, e.g., using weighting factors derived from a composite channel response and an impairment correlation or estimated using adaptive filtering techniques.

Figure 4:
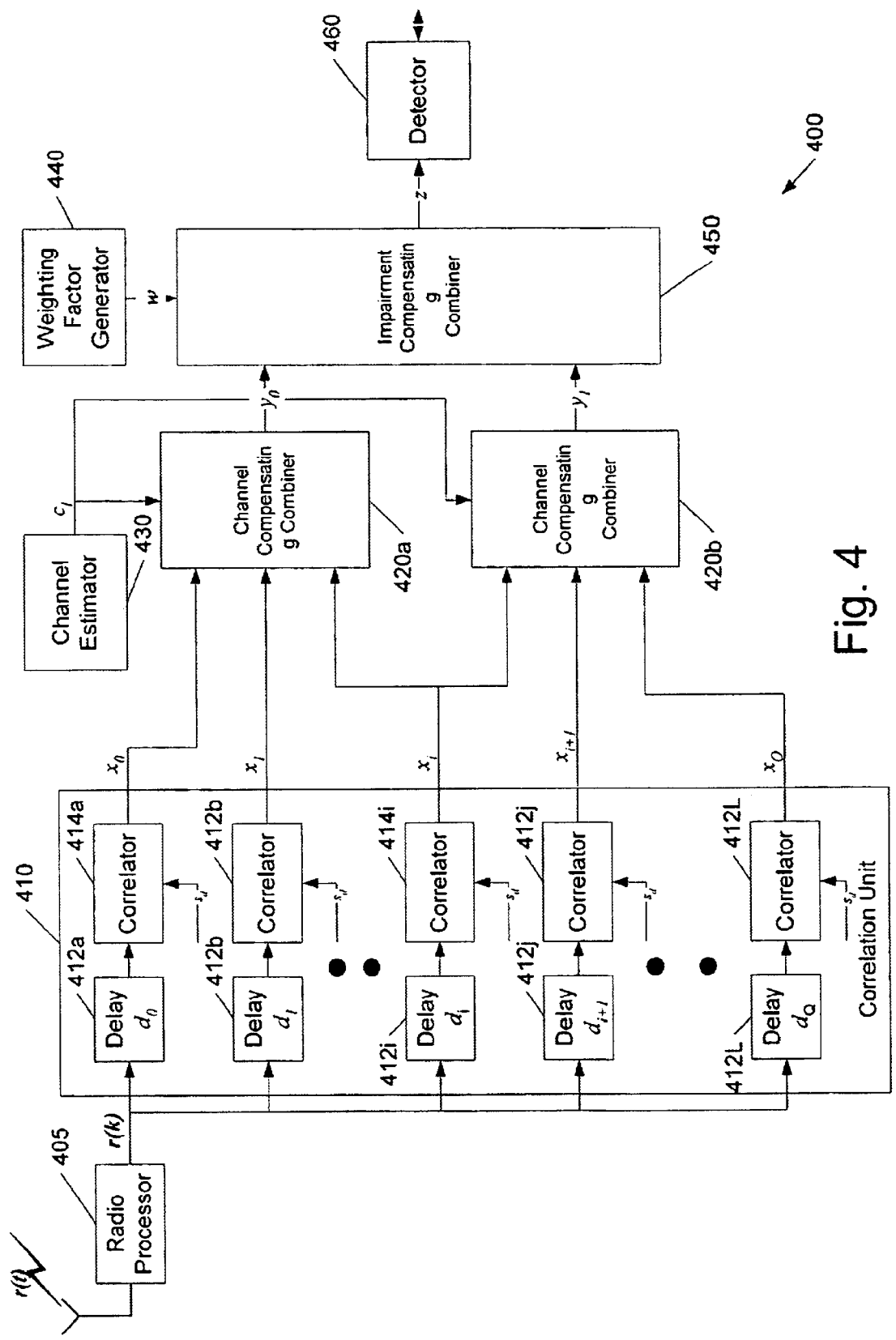
FIG. 4 is a schematic diagram illustrating a multistage RAKE receiver according to an embodiment of the present invention.

FIG. 4 illustrates a multistage RAKE receiver 400 according to an embodiment of the present invention, which recovers information represented by a spread spectrum signal according to a desired spreading sequence $s_d$ from a composite signal r(t) received from a communications medium. The receiver 400 includes means for receiving the composite signal r(t), e.g., a radio processor 405 that performs such operations for example, as amplifying the signal r(t), mixing, filtering and producing baseband samples r(k) of the received signal r(t). A correlation unit 410, here shown as a bank of delays 412a–412L linked to a bank of correlators 414a–414L, correlates delayed versions of the baseband signal r(k) to the desired spreading sequence $s_d$. It will be appreciated that the radio processor 405 may perform a variety of other functions, and that the correlation unit 410 may be implemented in other forms, such as by using a sliding correlator or by delaying the desired sequence $s_d$ and placing delays 412a–412L after the correlators 414a–414L.

Respective first and second groups of correlations $x_0$–$x_i$, $x_i$–$x_Q$ produced by the correlation unit 410 are combined in respective first and second combiners 420a, 420b, here shown as channel compensating combiners that combine the correlations according to channel coefficients $c_l$ estimated by a channel estimator 430. As used herein, "channel compensating" combining generally refers to combining operations that include the use of channel coefficients, including, but not limited to, operations that match a channel response. It will be appreciated that the channel estimator 430 may estimate channel coefficients in a number of different ways. e.g., by estimation from pilot symbols (e.g., in a pilot or other channel) or recovered data symbols. Such techniques are known to those skilled in the art and will not be described in further detail herein.

First and second combined values $y_0$, $y_1$ produced by the first and second combiners 420a, 420b are combined in a third combiner 450, here shown as an correlated impairment compensating combiner that combines the first and second combined values $y_0$, $y_1$ according to weighting factors weighting factors w generated by a weighting factor generator 440. As will be shown in detail below, the weighting factor generator 440 may generate the weighting factors w in a number of different ways, including by explicit calculation from an estimated composite channel response and an estimated impairment correlation, or by adaptive filtering techniques. The third combiner 450 produces a decision statistic z that may be used by a detector 460 to estimate information represented by the originally transmitted spread spectrum signal corresponding to the desired spreading sequence $s_d$. The detector 460 may, for example, implement soft decision decoding, such as convolutional decoding or turbo decoding.

It will be appreciated that the receiver 400 of FIG. 4 may be implemented in a number of different ways. Although the description herein refers to employment of the receiver 400 in a mobile or other terminal that is operative to communicate with a base station of a wireless communications system, the receiver 400 can be implemented in a number of other forms including, but not limited to, receivers used in cellular base station transceivers, satellite transceivers, wireline transceivers, and other communications devices. The correlation unit 410, combiners 420a, 420b, 450, channel estimator 430, weighting factor generator 440 and detector 460 may be implemented using, for example, an application-specific integrated circuit (ASIC), digital signal processor (DSP) chip or other processing device configured to perform the described processing functions. It will also be understood that, in general, these and other components of the receiver 400 may be implemented using special-purpose circuitry, software or firmware executing on special or general-purpose data processing devices, or combinations thereof.

In a simplified two-ray example for an IS-95 system, correlations $x_0$, $x_1$, $x_2$ of respective groups of correlations $x_0$, $x_1$, and $x_1$, $x_2$ produced from a correlation unit, such as the correlation unit 410 of FIG. 4, may be represented as:

$$x_0 = \frac{1}{N}\sum_{k=0}^{N-1} s^*(k)r(k) = \frac{1}{N}\sum_{k=0}^{N-1} W(k)p^*(k)r(k) \quad (1)$$

$$x_1 = \frac{1}{N}\sum_{k=0}^{N-1} s^*(k)r(k+1) = \frac{1}{N}\sum_{k=0}^{N-1} W(k)p^*(k)r(k+1), \quad (2)$$

$$x_2 = \frac{1}{N}\sum_{k=0}^{N-1} s^*(k)r(k+2) = \frac{1}{N}\sum_{k=0}^{N-1} W(k)p^*(k)r(k+2), \quad (3)$$

where r(k) is the baseband version of the received signal, s(k) is the spreading sequence, W(k) is the Walsh sequence assigned to the receiver, and p(k) is the complex scrambling sequence used by the base station. Division by N is included for ease of explanation, though it may be omitted in practice. First and second combiners, along the lines of the first and second combiners 420a, 420b of FIG. 4, produce first and second combined outputs $y_0$, $y_1$, as given by:

$$y_0 = \hat{c}^*_0 x_0 + \hat{c}^*_1 x_1 \quad (4)$$

and $$y_1 = \hat{c}^*_0 x_1 + \hat{c}^*_1 x_2, \quad (5)$$

where $\hat{c}_0$ and $\hat{c}_1$ are complex channel coefficient estimates associated with rays whose timing corresponds to $x_0$ and $x_1$. The channel coefficient associated with $x_2$ is zero. Thus, it may be observed that (4) and (5) can be interpreted as describing a sliding RAKE receiver, in that the same channel coefficients are used in both combiners.

The first and second combined values $y_0$, $y_1$ are then combined according to weighting factors $w_0$, $w_1$ in a weighted combiner, such as the combiner 450 of FIG. 4, producing a decision statistic z, given by:

$$z = w^*_0 y_0 + w^*_1 y_1, \text{ or} \quad (6)$$

$$z = \text{Re}\{w^*_0 y_0 + w^*_1 y_1\},$$

wherein Re{ } denotes the real part of the complex argument. The decision statistic can be used, for example, to determine a bit value (e.g., based on the sign of the decision statistic) or to provide soft values for subsequent decoding.

Determining Weighting Factors Explicitly

According to a first embodiment of the present invention, the weighting factors w generated by the weighting factor generator 440 are determined by first estimating a channel response and power of interfering spread spectrum signals (e.g., signals from the same base station or nearby base stations) and thermal noise. The channel response estimate and statistical properties of the desired spreading sequence $s_d$ are then used to determine a "composite" channel (impulse) response h, which reflects effects of the transmit pulse shape filter and/or other elements on the transmitting end, as well as the effects of the communications medium, radio processing elements, and the first and second combiners 420a, 420b. The channel response estimate and the power estimates are used to determine an overall impairment correlation R that includes respective components attributable to own-cell interference, other-cell interference and thermal noise, to obtain an overall impairment correlation matrix R. The composite channel response h and the overall impairment correlation R are then used to compute the weighting factors w. The weighting factors w are derived taking into account the statistical properties of the spreading sequences, and more particularly, are explicitly calculated using information related to the spreading sequences and the transmitted spread spectrum signals with which they are associated. Weighting factors w can be intermittently calculated, for example, upon substantial changes in the delays 412a–412L and the channel estimates.

It can be shown that given a set of first stage combiners (e.g., the combiners 420a, 420b of FIG. 4), the optimal combining weights to be used in the weighted combiner 450 may be expressed as:

$$w \underline{\Delta} (w_0, w_1, \ldots, w_{J-1})^T = R^{-1}h, \quad (7)$$

where h is the composite channel response, including the transmit filter, medium, receive filter and first stage combiner responses, and R is the impairment correlation matrix.

It can be further shown that the composite channel response h is given by:

$$h_i = \frac{1}{N}\sum_{j=0}^{L-1} c^*_j \sum_{l=0}^{L-1} c_l \sum_{m=1-N}^{N-1} C(m)R_p(d_i + mT_c + \tau_j - \tau_l), \quad (8)$$

where $c_l$ and $\tau_l$ are related to the medium response $$c(t) = \sum_{l=0}^{L-1} c_l \delta(t - \tau_l),$$

L is the number of multipaths, N is the spreading factor, $T_c$ is the chip duration, $R_p(t)$ is the autocorrelation function of the chip waveform, and C(m) is the aperiodic autocorrelation function of the spreading sequence defined as:

$$C(m) \equiv \begin{cases} \sum_{n=0}^{N-1-m} s(n)s*(n+m), & 0 \leq m \leq N-1 \\ \sum_{n=0}^{N-1+m} s(n-m)s*(n), & 1-N \leq m < 0 \end{cases} \quad (9)$$

where s(n) is the n-th chip of the spreading sequence.

To reduce complexity, traditional channel estimation can be used to estimate part of equation (8), without necessarily using pulse shape and spreading code information.

The impairment correlation matrix R can be decomposed into three terms:

$$R = R_{ISI} + R_{MUI} + R_n, \quad (10)$$

where $R_{ISI}$, $R_{MUI}$, and $R_n$ are correlation matrices of the inter-symbol interference, multiuser (e.g., intra-cell) interference, and additive white noise, respectively.

These components of R can be computed by the following expressions:

$$R_{ISI}(d_1, d_2) = \quad (11)$$

$$\frac{1}{N^2} \sum_{l=0}^{L-1} \sum_{j=0}^{L-1} \sum_{p=0}^{L-1} \sum_{q=0}^{L-1} \sum_{i=-\infty, j\neq 0}^{\infty} c_l c_j^* c_p^* c_q \sum_{m=1-N}^{N-1} (N - |m|) \times$$

$$R_p(d_1 + mT_c + \tau_j - iT - \tau_l) R_p^*(d_2 + mT_c + \tau_q - iT - \tau_p)$$

-continued $$R_{MUI}(d_1, d_2) = \quad (12)$$

$$\frac{\gamma_I}{N^2} \sum_{j=0}^{L-1} \sum_{p=0}^{L-1} \sum_{i=-\infty}^{\infty} \sum_{l=0}^{L-1} \sum_{q=0}^{L-1} c_l c_j^* c_p^* c_q \sum_{m=1-N}^{N-1} (N-|m|) \times$$

$$R_p(d_1 + mT_c + \tau_j - iT - \tau_l) R_p^*(d_2 + mT_c + \tau_q - iT - \tau_p)$$

$$(1 - d\delta(m)\delta(i))$$

and $$R_p(d_1, d_2) = \frac{\gamma_N}{N} \sum_{l=0}^{L-1} \sum_{j=0}^{L-1} \sum_{m=1-N}^{N-1} c_l c_j^* C(m) R_p(d_1 - d_2 + mT_c + \tau_j - \tau_l) \quad (13)$$

where $\gamma_1$ is the multiuser interference to signal power ratio, and $\gamma_N$ is the noise to signal power ratio. The variable $\alpha$ in (12) takes values on $\{1, 0\}$; if orthogonal spreading is used, $\alpha=1$, whereas if pseudo random spreading is used, $\alpha=0$. By considering various combinations (including combinations other than $d_1$, $d_2$), all elements of the impairment correlation matrix R can be obtained (the infinite summation in i can be truncated to include only significant terms, e.g., i=−1, 0, 1). From the above equations, if the receiver has the knowledge of (1) the channel impulse response c(t), (2) the autocorrelation function of the chip waveform $R_p(t)$, (3) the interference to signal ratio ($\gamma_1$), (4) the noise to signal ratio $\gamma_N$, and (5) the aperiodic autocorrelation function of the spreading sequence C(m), the weighting factors w can be computed explicitly.

In many applications, multiuser interference is much stronger than inter-symbol interference. Accordingly, the impairment correlation R matrix can be approximated by:

$$R \approx R_{MUI} + R_n \quad (14)$$

In this case, these terms include a common scaling factor, a signal power S in the ratios $\gamma_1$, $\gamma_N$. This term can be omitted, so that only the interference power I and noise power need be estimated. Alternatively, signal power can be estimated and used to estimate the ratios $\gamma_1$, $\gamma_N$.

Furthermore, in practice it may be cumbersome to calculate the aperiodic autocorrelation function C(m), as such a function typically varies from symbol to symbol. To reduce the complexity of weight calculation, an average aperiodic autocorrelation function $\overline{C}(m)$ can be used instead, as given by:

$$\overline{C}(m) = N\delta(m) \quad (15)$$

Using equations (14) and (15), equations (11)–(13) can be greatly simplified.

In handoff scenarios, the interference as a result of multiuser signals from each base station typically is colored in its own way by the channel response, and the multiuser interference component $R_{MUI}$ can be calculated by:

$$R_{MUI}(d_1, d_2) = \quad (16)$$

$$\sum_{k=1}^{K} \left\{ \frac{\gamma_I^{(k)}}{N^2} \sum_{l=0}^{L-1} \sum_{j=0}^{L-1} \sum_{p=0}^{L-1} \sum_{i=-x}^{\infty} \sum_{q=0}^{L-1} c_l^{(k)} (c_j^{(k)})^* (c_p^{(k)})^* c_q^{(k)} \sum_{m=1-N}^{N-1} (N - |m|) \times \atop R_p(d_1 + mT_c + \tau_j^{(k)} - iN - \tau_l^{(k)}) R_p^*(d_2 + mT_c + \tau_q^{(k)} - iN - \tau_p^{(k)})(1 - \alpha_k \delta(m)\delta(i)) \right\}$$

where superscript k is used for indexing base stations, and k=1 corresponds to the base station transmitting the desired spread spectrum signal. Typically, when orthogonal spreading is used, $\alpha_1=1$ while $\alpha_k=0$, for k≠1. Such an approach may also be used with transmitter diversity, in which the two transmitted signals originate from the same site, but from multiple spatially and/or polarization diverse antennas.

Figure 5:
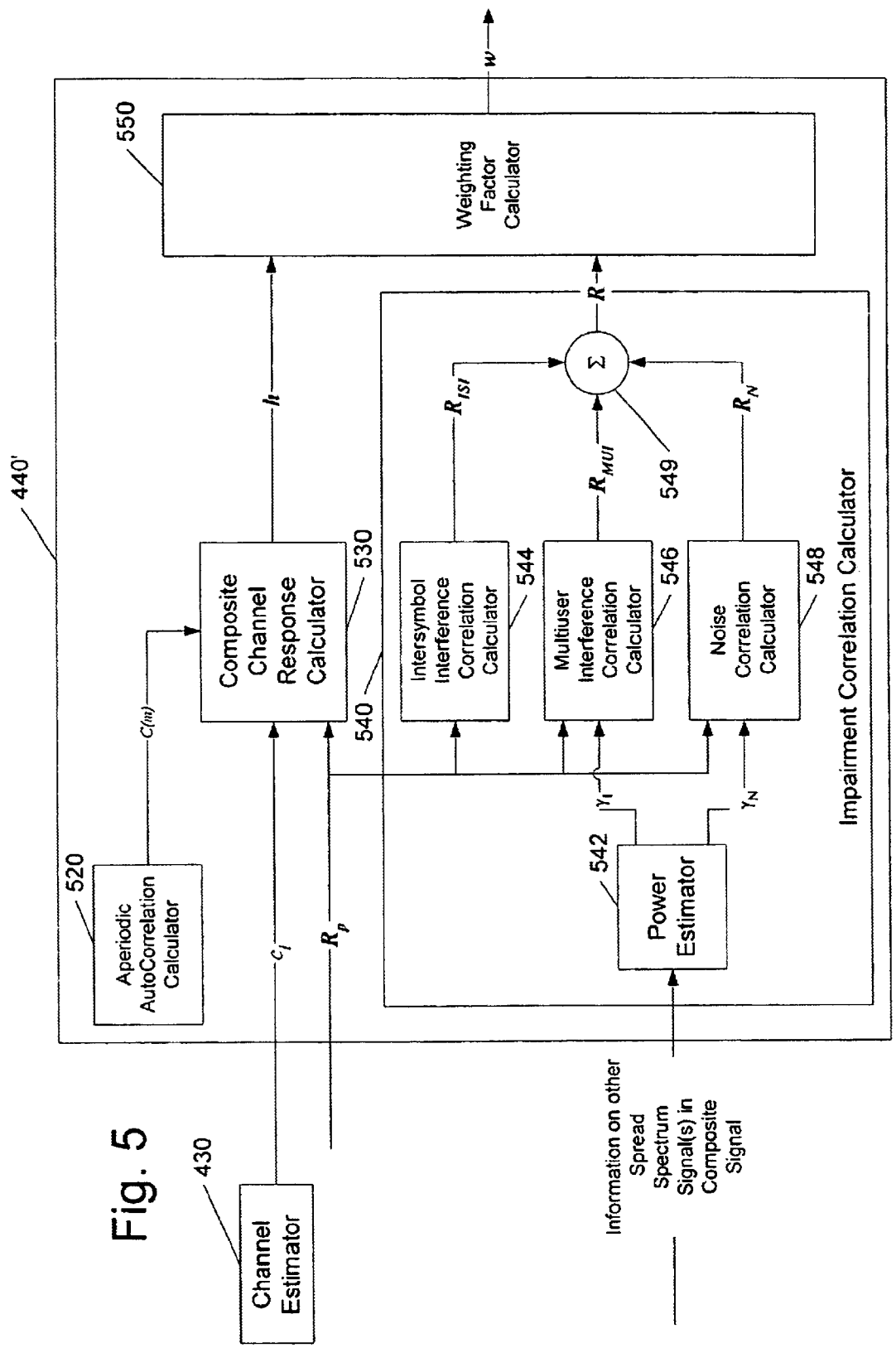
FIG. 5 is a schematic diagram illustrating a weighting factor generator according to an embodiment of the present invention.

FIG. 5 illustrates an exemplary weighting factor generator 440' according to an embodiment of the present invention. The weighting factor generator 440' includes an aperiodic autocorrelation calculator 520 that determines a value of the aperiodic autocorrelation function C(m). Channel tap coefficients $c_I$ provided by channel estimator 430 and the value of the periodic autocorrelation function C(m) are supplied to a composite channel response calculator 530 that calculates the composite channel response h based on the statistical properties of the desired spreading sequence, i.e., the autocorrelation $R_p(t)$ of the desired spreading sequence, using equation (8).

The weighting factor generator 440' also includes an impairment correlation calculator 540 that computes an impairment correlation R according to equation (10) or (14). The impairment correlation calculator 540 includes a power estimator 542 that supplies respective power ratio estimates $\gamma_1$, $\gamma_N$ that are supplied to respective multiuser interference correlation and noise correlation calculators 546, 548 that compute multiuser interference correlation and noise correlation components $R_{MUI}$, $R_N$, respectively, according to equations (12) and (13). An intersymbol interference correlation calculator 544 calculates an intersymbol interference correlation component $R_{ISI}$. The intersymbol interference impairment correlation, multiuser interference correlation and noise correlation components $R_{MUI}$, $R_N$, $R_{ISI}$ are summed by a summer 549 to produce the impairment correlation R, which is used, along with the composite channel response h, to generate weighting factors w in a weighting factor calculator 550.

It will be understood that the apparatus illustrated in FIG. 5 may be modified along the lines suggested above. For example, the aperiodic autocorrelation calculator 520 may be eliminated, with the average aperiodic autocorrelation $\overline{C}(m)$ being substituted for the calculated aperiodic autocorrelation C(m), as described above in reference to equations (15), (13) and (8). The intersymbol interference impairment correlation calculator 544 may also be eliminated, along the lines described in reference to equation (14).

Further simplification in determining weighting factors w can be achieved by using an iterative approach that obviates the need to compute the inverse $R^{-1}$ of the impairment correlation R to determine the weighting factors w. The weighting factors w, impairment correlation matrix R, and the composite channel response h form a linear system of the form:

$$Ax=b, \quad (17)$$

where A=R, x=w, and b=h.

As equation (17) describes a linear system, any of a number of techniques for solving linear systems may be used to find the weights. Preferably, an iterative technique that can compute new weighting factors from already existing weights without requiring matrix inversion is utilized. For example, an iterative Gauss-Seidel technique may be used, where weighting factors w are calculated by:

$$w_i(k+1) = \left( h_i - \sum_{j=0}^{i-1} r_{ij} w_j(k+1) - \sum_{j=i+1}^{n-1} r_{ij} x_j(k) \right) / r_{ii}, \quad (13)$$

where n is the dimension of the vectors w and h, $r_{ij}$ is the (i, j)th element of the impairment correlation matrix R, and k is the stage of iteration. Initially, the weighting factor corresponding to a traditional RAKE combined value can be set to one, and other weighting factors set to zero. If the initial guess (the values of w in the previous iteration or previous symbol period) are close to the correct solution, the iteration should converge after only one or a few iterations. Convergence can be accelerated by modifying the calculated $w_i(k+1)$ to:

$$w_i(k+1) = \lambda w_i(k+1) + (1-\lambda) w_i(k), \quad (14)$$

where $\lambda$ is a relaxation parameter. For $1 < \lambda \leq 2$, faster convergence may be obtained for already convergent systems, and if normal iteration is not convergent, $k \leq 1$ may be used to obtain convergence. These and other techniques for iterative solution of linear systems are described in the *Handbook of Mathematics and Computer Science*, by Harris et al., published by Springer-Verlag (New York, 1998), at pp. 456–457.

Referring again to FIG. 5, power estimator 542 estimates interference to signal and noise to signal ratios $\gamma_1$, $\gamma_N$, which are used in computing the weighting factors w. As the inter-symbol interference impairment correlation component $R_{ISI}$, can be neglected, as described above, it may suffice to determine a ratio $\gamma_1/\gamma_N$ of the interference to signal and noise to signal ratios to perform computation of the weighting factors w, setting $\gamma_N$ to some nominal number, such as 1 (equivalent to estimating a ratio of interference power to noise power).

In a wireless cellular communications system, a base station (BS) may inform a mobile or other terminal of power levels of all the spread spectrum signals being transmitted. The terminal may then simply compute its received power using conventional means, and use the base station information to determine the relative received power of the interference. Using these interference power estimates and an estimate of the total received power (which also may be obtained using conventional means), an estimate of the noise power (i.e., power of other interference and thermal noise) may then be obtained.

If a base station does not transmit power level information, however, it still may inform the terminal of which spreading codes are currently being used. Using such information, power information for the interfering signals can be determined using an apparatus such as the power estimator 542 illustrated in FIG. 6. Baseband samples r(k) of a received composite signal are passed through banks of delays 610a–610L, with each of the delayed versions of the baseband signal r(k) being descrambled by a descrambler 620a–620L and processed by a fast Walsh transformer 630a–630L. The resulting correlation information is then combined by a maximal ratio combiner 640, the combined values indicating the energy in each code dimension. An interference power estimator 650 calculates the energy in dimensions spanned by the active codes (other than the desired code), and a noise power estimator 660 calculates energy in dimensions spanned by inactive codes.

Figure 6:
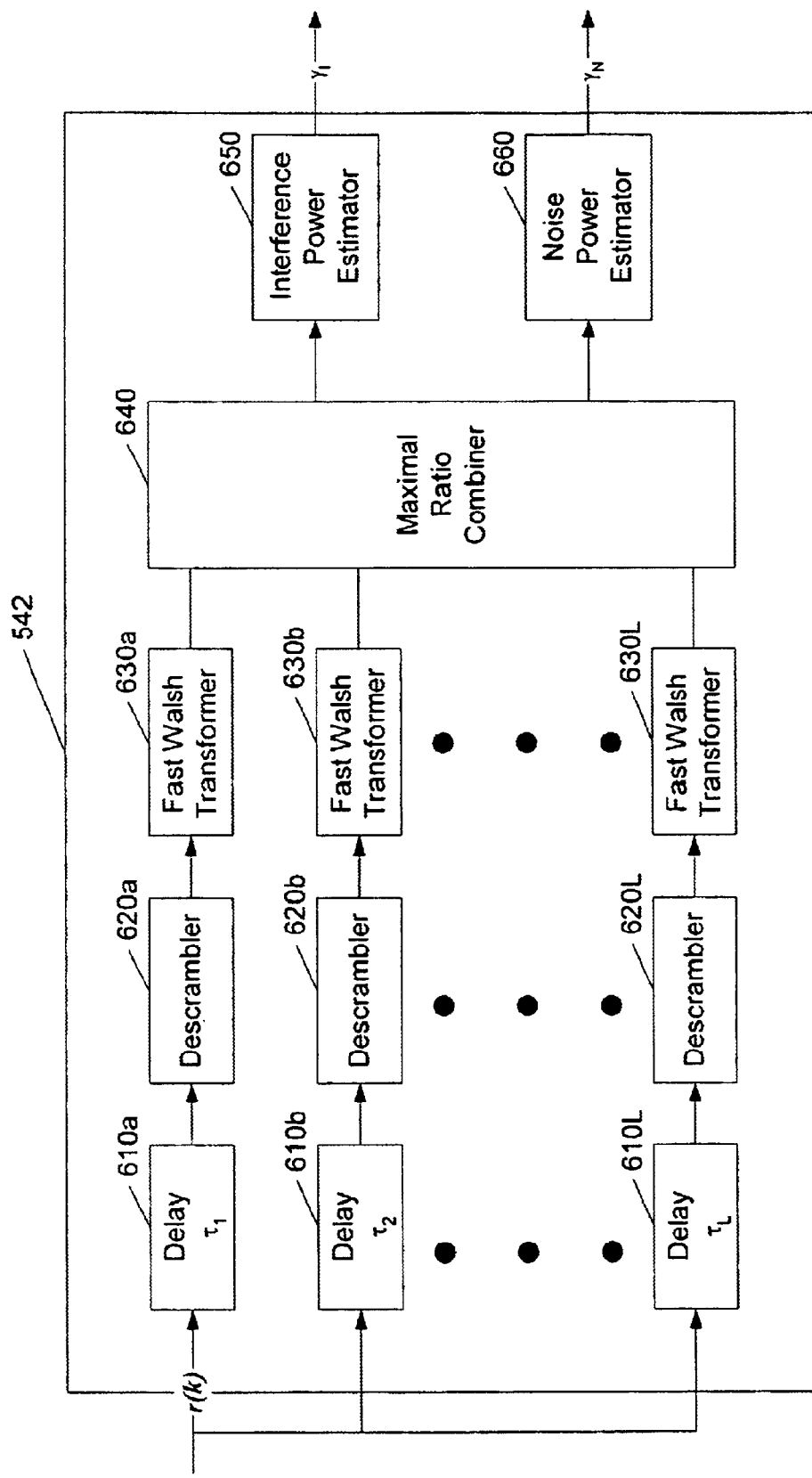
FIG. 6 is a schematic diagram illustrating an apparatus for detecting and/or determining power of interfering spread spectrum signals.

If the information on the active codes is not provided to the terminal, then the apparatus of FIG. 6 may be modified to detect which codes are active by, for example, thresholding the magnitude squared of the outputs of the maximal ratio combiner 640. Smoothing the magnitude square of the output of the maximal ratio combiner for inactive 4codes can provide an estimate of the white noise power. There may be a slight bias from the interference and desired signal echoes, which can be removed. Smoothing the magnitude squared of the output of the maximal ratio combiner 640 for the active codes, estimates of $I_i+N$ can be obtained, where $I_i$ is the interference power of the ith user and N is the white noise power. Using the estimate of N, estimates of $l_i$ can be obtained and summed to obtain an estimate of the overall interference power. Exemplary techniques for detecting spreading sequences and estimating power associated with particular spreading codes are described in U.S. patent application Ser. No. 09/235,470 to Wang et al., filed Jan. 22, 1999, assigned to the assignee of the present invention, and incorporated herein by reference in its entirety.

The above-described operations for explicitly determining weighting factors are similar to operations described in a United States Patent Application entitled "RAKE Combining Methods and Apparatus using Weighting Factors Derived From Knowledge of Spread Spectrum Signal Characteristics" (application Ser. No. 09/344,899), by Bottomley et al., assigned to the assignee of the present invention, filed concurrently herewith, and incorporated herein by reference in its entirety.

Determining Weighting Factors by Interference Rejection Combining (IRC)

According to a second embodiment of the present invention, the weighting factors w generated by the weighting factor generator 440 are determined by determining a post-combining composite channel response and generating an error vector therefrom that is used to estimate an impairment correlation.

Figure 7:
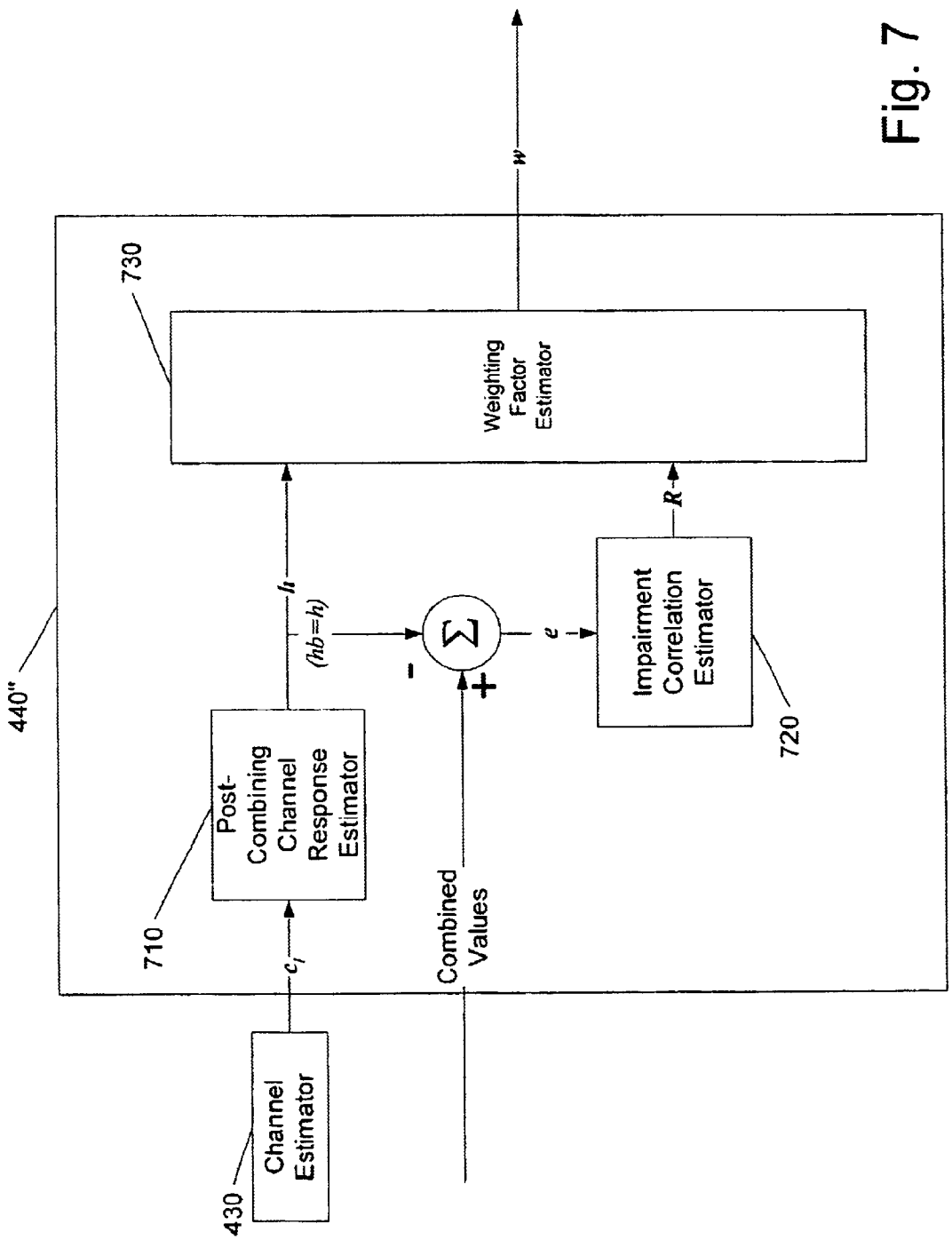
FIG. 7 is a schematic diagram illustrating a weighting factor generator according to another embodiment of the present invention.

Referring to FIG. 7, a weighting factor generator 440" includes a post-combining channel response estimator 710 that computes a channel response h that reflects the first stage of combining performed by the first and second combiners 420a, 420b of FIG. 4 (the post-combining channel response estimator 710 may operate in the same manner as the composite channel response calculator 530 shown in FIG. 5). The post-combining channel response h is subtracted from the combined values produced by the first combining stages to generate an error vector e, that is in turn provided to an impairment correlation estimator 720 that estimates an impairment correlation R. The post-combining channel response h and the impairment correlation R are provided to a weighting factor estimator 730 that estimates weighting factors w.

Returning to the two-ray example discussed with respect to equations (1)–(6), the post-combining channel response h can be expressed as the channel coefficient response convolved with itself, such that:

$$h_0 = \hat{c}^*_0 \hat{c}_0 + \hat{c}^*_1 \hat{c}_1 = |\hat{c}_0|^2 + |\hat{c}_1|^2 \qquad (16)$$

and $$h_1 = \hat{c}^*_0 \hat{c}_1, \qquad (17)$$

where $h_0$, $h_1$ are components of the post-combining channel response h. For known or detected symbol $\hat{b}$, components $e_0$, $e_1$ of the error vector e are thus:

$$e_0 = y_0 - \hat{b} h_0 = y_0 - h_0 \qquad (18)$$

and $$e_1 = y_1 - \hat{b} h_1 = y_1 - h_1. \qquad (19)$$

The symbol b may be known (pilot) or estimated; here it is assumed that the IS-95 pilot channel is used, wherein $\hat{b}=1$.

The impairment correlation matrix R may be updated using the expression:

$$R(k) = \lambda R(k-1) + e(k)e^H(k), \qquad (20)$$

wherein H denotes a conjugate transpose. Because R is Hermitian, only the diagonal and one of the off-diagonal triangles of R need be determined. The above-described techniques for determining a channel response h and an impairment correlation R for a system with single-stage combining is described in detail in U.S. patent application Ser. No. 09/165,647, by Bottomley, filed Oct. 2, 1998, assigned to the assignee of the present invention and incorporated by reference herein in its entirety. As with the explicit approach described above, weighting factors w can be determined from h and R by inverting R and multiplying it by h, or by using iterative techniques which obviate the need to invert the impairment correlation matrix R.

As multipath components appear and disappear due to movement of the terminal or due to movement of objects in the terminal's environment, sudden changes may occur in the impairment correlation matrix corresponding to the outputs of the first combining stage. To track such changes, it may be desirable to estimate a large impairment matrix correlation associated with the outputs of the correlators, before the first stage of combining, as described in the aforementioned patent application Ser. No. 09/165,647, to Bottomley, filed Oct. 2, 1998. This larger impairment correlation matrix may be used, along with the first stage combining weighting factors (typically channel estimates), to determine the impairment correlation matrix after the first step of combining. Basically, the elements in the impairment correlation matrix needed for the second stage of combining would be a weighted sum of the elements in the impairment correlation matrix associated with the correlator outputs. The weighting factors would be products of the first stage combining weighting factors.

Determining Weighting Factors by Adaptive Filtering

Alternatively, the combining weighting factors w may be "learned" using adaptive filtering techniques. Starting with an initial set of weighting factors, post-combining (the combining performed by the third combiner 430 of FIG. 4) would be applied to combined values produced from pilot channel correlations, and compared to the known pilot channel values. An error thus generated may then be used to produce updated weighting factors using a variety of known adaptive filtering approaches, such as Least Mean Squares (LMS) and Recursive Least Squares (RLS) techniques.

Figure 8:
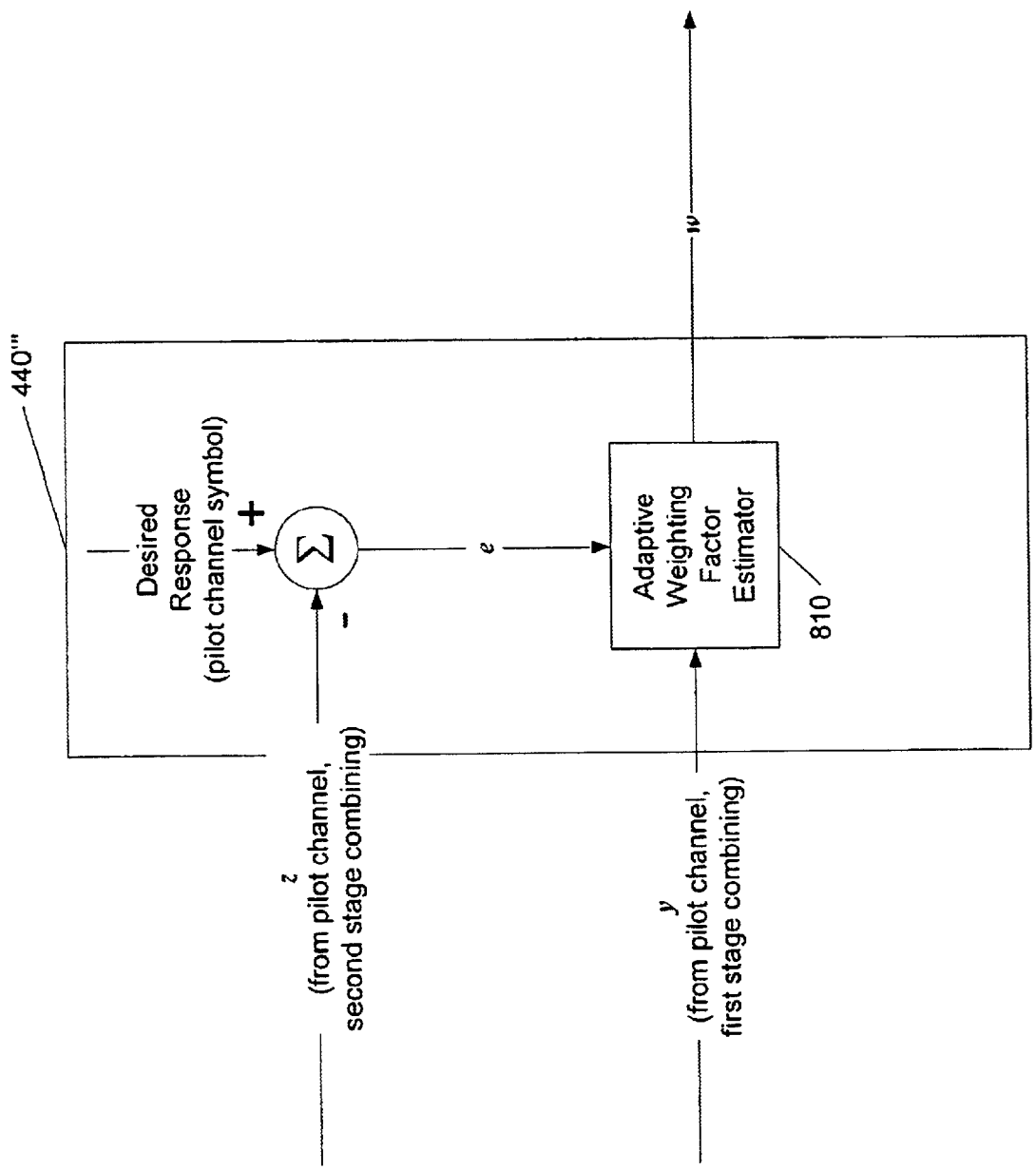
FIG. 8 is a schematic diagram illustrating a weighting factor generator according to another embodiment of the present invention.

As illustrated in FIG. 8, according to an embodiment of the present invention, a weighting factor generator 400''' includes an adaptive weighting factor estimator 810 that adaptively estimates weighting factors w based on inputs y to the second stage combiner 430 of FIG. 4 and an error e generated from a comparison of outputs z of the combiner with a desired response. Generally, the values y, z are generated from received data corresponding to a known or estimated symbol, e.g., a pilot symbol or a decoded symbol, with the desired response representing the known or estimated symbol. The adaptive weighting factor estimator 400''' may use, for example, an LMS algorithm, whereby the weighting factors w are updated as:

$$w(k) = w(k-1) + \mu y(k) e^*(k), \qquad (21)$$

where $\mu$ is an adaptive step size, the value of which can be determined through trial and error.

Optimal Finger Placement

Referring again to FIG. 4, for the above described embodiments, it is preferable that optimal finger locations (i.e., delay values) be used in the correlation unit 410 and weighting factor generator 440. Various delay optimization techniques and criteria may be used. A preferred optimization metric can be expressed as:

$$M = h^H w \text{ or} \qquad (15)$$

$$M = h^H R^{-1} h,$$

wherein optimization is achieved by selecting delays that maximize M.

Exemplary Multistage Combining Operations

Figure 9:
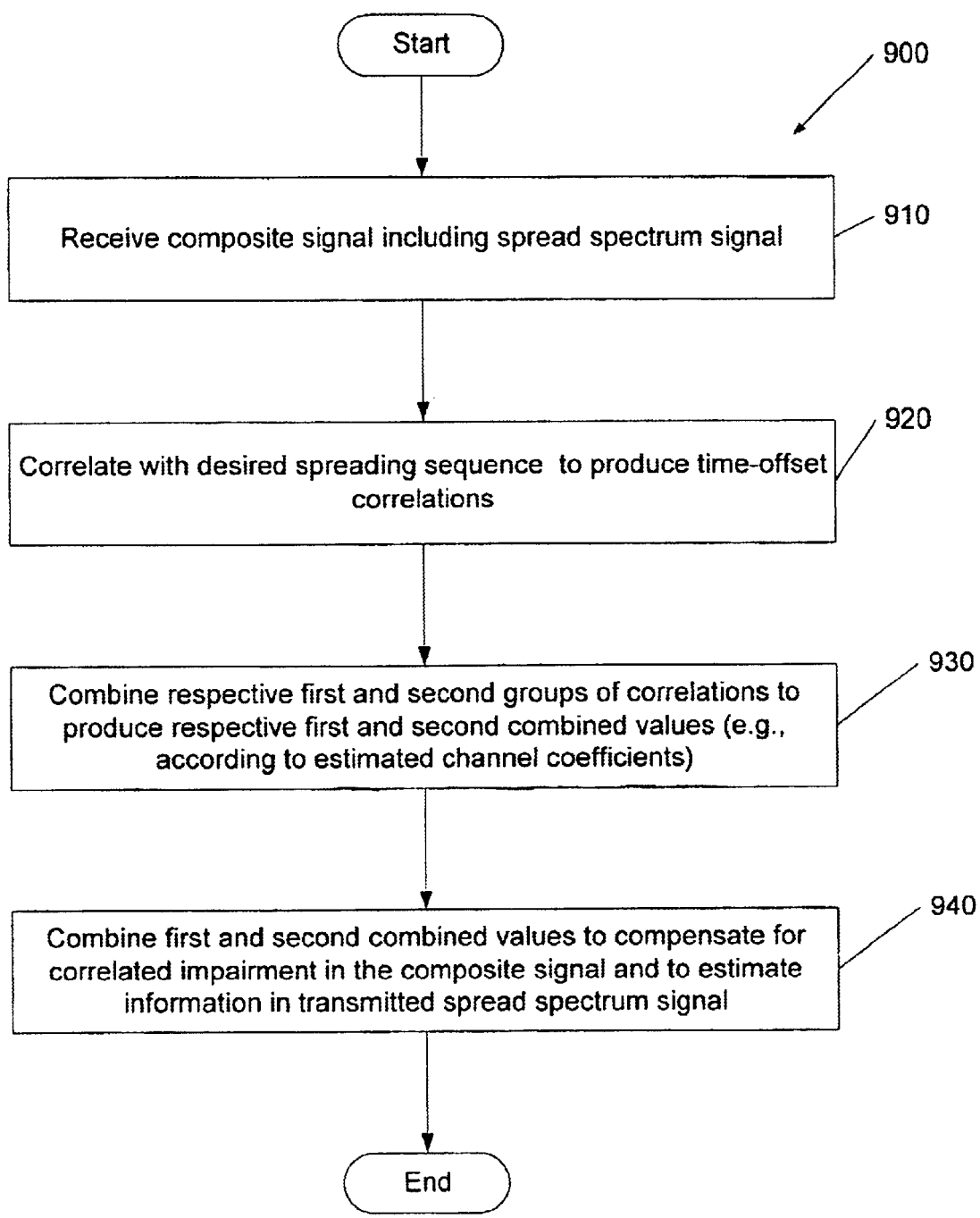
FIG. 9 is a flowchart illustrating exemplary operations for generating an estimate of information represented by a spread spectrum signal according to an embodiment of the present invention.
Figure 10:
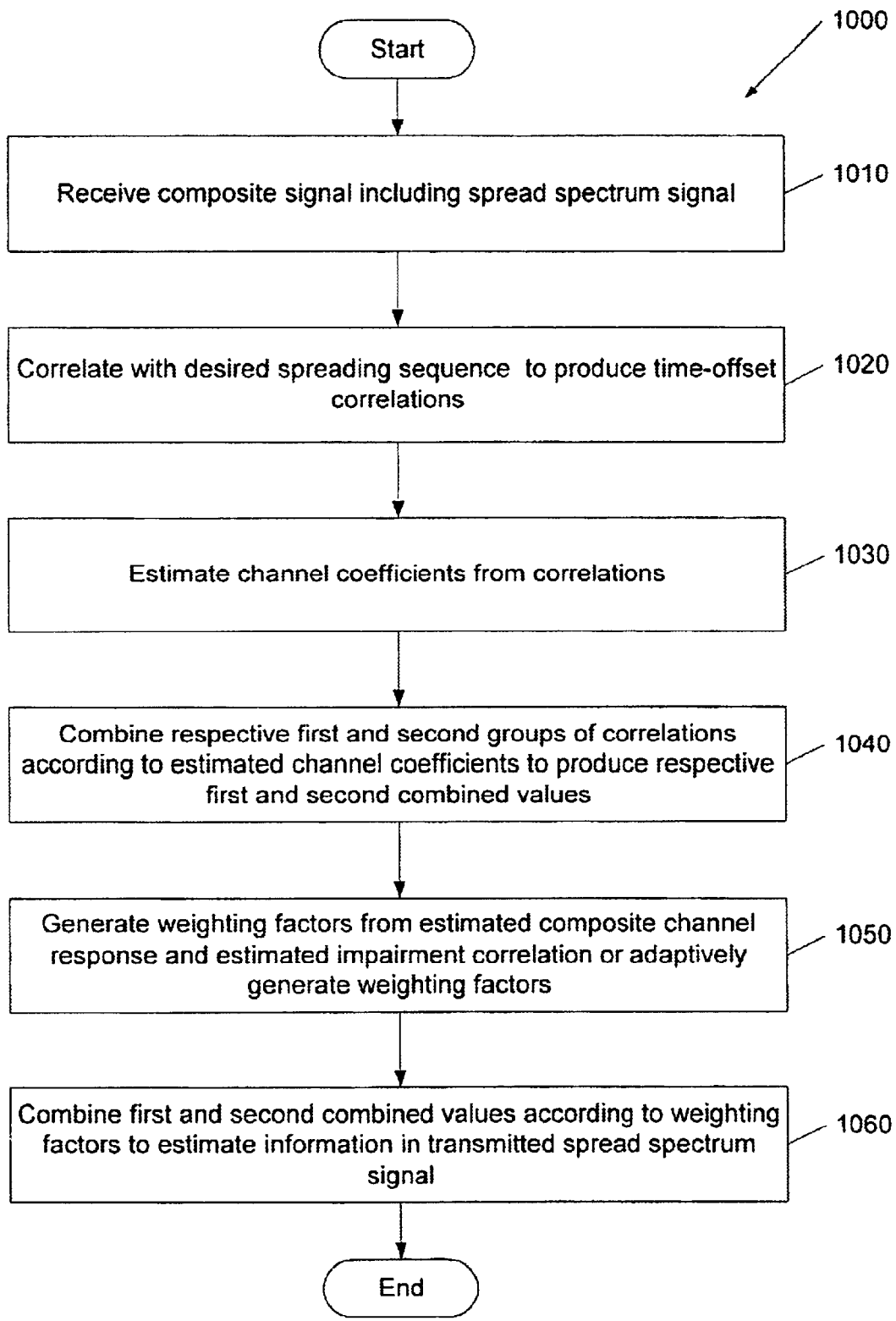
FIG. 10 is a flowchart illustrating exemplary operation for generating an estimate of information represented by a spread spectrum signal according to another embodiment of the present invention.

FIGS. 9–10 are flowchart illustrations of exemplary operations according to various aspects of the present invention. It will be understood that blocks of these flowcharts, and combinations of blocks in these flowcharts, can be implemented by computer program instructions which may be loaded and executed on a computer or other programmable data processing apparatus, such as a microcomputer, microprocessor, ASIC, DSP chip or other processing circuitry used to implement the receiver 400 of FIG. 4, to produce a machine such that the instructions which execute on the computer or other programmable data processing apparatus create means for implementing the functions specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Accordingly, blocks of the flowcharts of FIGS. 9–10 support combinations of means for performing the specified functions and combinations of steps for performing the specified functions. It will also be understood that each block of the flowcharts of FIGS. 9–10, and combinations of blocks therein, can be implemented by special purpose hardware-based computer systems which perform the specified functions or steps, or combinations of special purpose hardware and computer instructions.

FIG. 9 illustrates exemplary operations 900 for estimating information encoded in a spread spectrum signal transmitted in a communications medium according to an aspect of the present invention. A composite signal including the spread spectrum signal is received from a communications medium (Block 910). The composite signal is correlated with the desired spreading sequence associate with the spread spectrum signal to produce a plurality of time-offset correlations (Block 920). Respective first and second groups of the correlations are combined, e.g., according to estimated channel coefficients, to produce respective first and second combined values that are compensated for effects of a channel over which the spread spectrum signal is received (Block 930). The first and second combined values are then combined in manner that compensates for correlated impairment (interference plus noise) in the composite signal, producing an estimate of information in the spread spectrum signal (Block 940).

FIG. 10 illustrates exemplary operations 1000 for recovering information encoded in a spread spectrum signal transmitted in a communications medium, according to another aspect of the present invention. A composite signal including the spread spectrum signal is received from a communications medium (Block 1010). The composite signal is correlated with the desired spreading sequence associated with the spread spectrum signal to produce a plurality of time-offset correlations (Block 1020). Channel coefficient estimates are generated from the correlations (Block 1030). Respective first and second groups of the correlations are combined according to the estimated channel coefficients to produce respective first and second combined values (Block 1040). Weighting factors are generated from an estimated composite channel response and impairment correlation, or are adaptively generated as described above (Block 1050). The first and second combined values are then combined according to the weighting factors to estimate information in the spread spectrum signal (Block 1060).

It will be appreciated that a number of variations to the above-described exemplary embodiments and operations may be utilized according to the present invention. For example, a variety of configurations of the correlation unit 410 of FIG. 4 may be utilized, including respective banks of integrate-and-dump correlators, a single bank of such correlators, a sliding correlator or a selectively inhibited correlator as described in the aforementioned U.S. patent application Ser. No. 09/165,647 (Bottomley). A variety of other weighting factor computation techniques can also be used, including a number of known antenna array processing techniques. For example, an impairment correlation estimate may be replaced by a despread correlation estimate in which the error vector e is replaced with a correlation values vector x when forming the impairment correlation estimate. This approach can cancel interference, but the soft decision statistic produced by such an approach may not work as well in subsequent processing steps.

A variety of channel tracking approaches may be used with the present invention, including LMS techniques, KLMS techniques as described in "Adaptive MLSE Performance on the D-AMPS 1900 Channel," by Jamal et al., *IEEE Transactions on Vehicular Technology*, vol. 46, pp. 634–641 (August 1997), RLS techniques and Kalman tracking techniques. Although chip-spaced rays are described herein, rays may generally have arbitrary spacing, including fractional spacing. Channel estimation can also be performed using interpolation between pilot symbols. A variety of impairment correlation estimation techniques may be used as well. For example, impairment correlation may be tracked or interpolated between pilot symbols.

Channel estimation may also include automatic frequency correction (AFC). Feedforward AFC can be applied to each correlator associated with a signal echo, with the resulting phase estimate being used to forming weighting factors by rotating channel estimates, as described in U.S. patent application Ser. No. 08/991,770, to Bottomley et al., filed Dec. 16, 1997, assigned to the assignee of the present invention and incorporated by reference herein in its entirety. Feedback correction of a voltage controlled oscillator could be based on a combination of the frequency error estimates.

It will also be appreciated that other combining strategies may also be used within the scope of the present invention. For example, the impairment-compensating second combining stage may itself be implemented in multiple stages, e.g., a first combining stage based on an impairment correlation estimate and a second combining stage based on a composite (post-combining) channel response. Multiple receive antennas may also be used.

A modified approach may also be followed in which the impairment correlation used is a combination of an impairment correlation estimate and a fixed value. This can provide a graceful mechanism for switching between conventional combining approaches (wherein the fixed value is the correlation matrix associated with the combiner response), and combining techniques according to the present invention. Such a mixed approach can also be used to switch between an adaptive estimate and a known structure. For example, if the interference in the composite signal is non-dispersive, i.e., the impairment is only colored by the receive structure, the fixed component of the impairment correlation can be a matrix of pulse shape autocorrelation values, possibly scaled by an estimate of noise power. The "fixed" component can also be adaptive, using a pulse shape autocorrelation matrix scaled by an adaptive noise power estimate. The interference cancellation may be "softly" turned on or off, by weighting the "normal" RAKE combiner output more and the added "slides" less, using a fixed or adaptive scaling factor.

A multipass approach to parameter estimation may also be used with the present invention. Despread values corresponding to a frame can be stored. In a post-combining process, error detection and/or correction coding can be used to detect errors, and successfully detected symbols can be used as reference values for channel estimation, weighting factor estimation, and the like. Multipass techniques are generally described in U.S. Pat. No. 5,673,291 to Dent.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A method of recovering information encoded in a spread spectrum signal transmitted in a communications medium, the method comprising the steps of:

receiving a composite signal including a spread spectrum signal from the communications medium;

correlating the received composite signal with a spreading sequence to generate time-offset correlations;

combining a first group of the correlations to produce a first combined value;

combining a second group of the correlations to produce a second combined value; and combining the first and second combined values in a manner that compensates for correlated impairment in the composite signal to generate an estimate of information in the transmitted spread spectrum signal, wherein said step of combining the first and second combined values comprises the step of combining the first and second values based on an estimated impairment correlation and on a composite channel response that reflects said step of combining the first group correlations and said step of combining the second group of correlations.

2. A method according to claim 1:

wherein said step of combining a first group of the correlations comprises the step of combining the first group of correlations in a manner that compensates for effect of a channel over which the spread spectrum signal is received; and wherein said step of combining a second group of the correlations comprises the step of combining the second group of correlations in a manner that compensates for effect of a channel over which the spread spectrum signal is received.

3. A method according to claim 2:

wherein said step of combining a first group of the correlations comprises the step of combining the first group of correlations according to estimated channel coefficients; and wherein said step of combining a second group of the correlations comprises the step of combining the second group of correlations according to estimated channel coefficients.

4. A method according to claim 3, wherein said step of combining a first group and said step of combining a second group are preceded by the step of generating the channel coefficient estimates.

5. A method according to claim 4, wherein said step of generating the channel coefficient estimates comprises the step of generating the channel coefficient estimates from at least one of a pilot channel, a pilot symbol or a decoded symbol.

6. A method according to claim 1:

wherein said step of combining the first and second combined values is preceded by the steps of:
estimating the composite channel response;
estimating the impairment correlation; and
generating weighting factors from the estimated composite channel response and the estimated impairment correlation; and wherein said step of combining the first and second combined values comprises the step of combining the first and second combined values according to the generated weighting factors.

7. A method according to claim 6, herein said step of generating weighting factors comprises the step of iteratively generating weighting factors from the estimated composite channel response, the estimated impairment correlation, and previously determined weighting factors.

8. A method of recovering information encoded in a spread spectrum signal transmitted in a communications medium, the method comprising the steps of:

receiving a composite signal including a spread spectrum signal from the communications medium;

correlating the received composite signal with a spreading sequence to generate time-offset correlations;

combining a first group of the correlations to produce a first combined value;

combining a second group of the correlations to produce a second combined value, and combining the first and second combined values in a manner that compensates for correlated impairment in the composite signal to generate an estimate of information in the transmitted spread spectrum signal, wherein said step of combining the first and second combined values comprises the step of combining the first and second values according to weighting factors to generate a third combined value, wherein the weighting factors are adaptively estimated based on comparison of the third combined value to a reference value.

9. A method according to claim 1, wherein said step of correlating comprises the step of correlating using at least one of a plurality of integrate and dump correlators, a sliding correlator, or a selectively inhibited sliding correlator.

10. A method according to claim 1, wherein said step of correlating comprises the step of correlating using a set of time delays that optimizes a metric that is proportional to a product of the weighting factors and the composite channel response.

11. A method of recovering information encoded in a spread spectrum signal transmitted in a communications medium, the method comprising the steps of:

receiving a composite signal including a spread spectrum signal from the communications medium;

correlating the received composite signal with a spreading sequence to generate a plurality of time-offset correlations;

combining a first group of the correlations according to a channel estimate to produce a first combined value;

combining a second group of the correlations according to a channel estimate to produce a second combined value; and combining the first and second combined values according to weighting factors that compensate for correlated impairment in the composite signal to generate an estimate information in the transmitted spread spectrum signal, wherein said step of combining the first and second combined values comprises the step of combining the first and second combined values based on an estimated impairment correlation and on a composite channel response that reflects said step of combining the first group of correlations and said step of combining the second group of correlations.

12. A method according to claim 11:

wherein said step of combining the first and second combined values is preceded by the steps of:
estimating the composite channel response;
estimating the impairment correlation; and
generating weighting factors from the estimated composite channel response and the estimated impairment correlation; and wherein said step of combining the first and second combined values comprises the step of combining the first and second combined values according to the generated weighting factors.

13. A method according to claim 12, wherein said step of generating weighting factors comprises the step of iteratively generating weighting factors from the estimated composite channel response, the estimated impairment correlations, and previously determined weighting factors.

14. A method of recovering information encoded in a spread spectrum signal transmitted in a communications medium, the method comprising the steps of:
  receiving a composite signal including a spread spectrum signal from the communications medium;
  correlating the received composite signal with a spreading sequence to generate a plurality of time-offset correlations;
  combining a first group of the correlations according to a channel estimate to produce a first combined value;
  combining a second group of the correlations according to a channel estimate to produce a second combined value; and
  combining the first and second combined values according to weighting factors that compensate for correlated impairment in the composite signal to generate an estimate information in the transmitted spread spectrum signal,
  wherein said step of combining the first and second combined values comprises the step of combining the first and second values to generate a third combined value, wherein the weighting factors are adaptively estimated based on comparison of the third combined value to a reference value.

15. A method according to claim 11, wherein said steps of combining a first group and said step of combining a second group are preceded by the step of generating the channel estimate.

16. A method according to claim 11, wherein said step of generating a channel estimate comprises the step of generating the channel estimate from at least one of a pilot channel, a pilot symbol or a decoded symbol.

17. A method according to claim 16, wherein said step of correlating comprises the step of correlating using at least one of a plurality of integrate and dump correlators, a sliding correlator, or a selectively inhibited sliding correlator.

18. A method according to claim 11, wherein said step of correlating comprises the step of correlating using a set of time delays that optimizes a metric that is proportional to a product of the weighting factors and the composite channel response.

19. An apparatus for recovering information encoded in a spread spectrum signal included in a composite signal, the apparatus comprising:
  a correlation unit operative to correlate the composite signal with a spreading sequence to generate time-offset correlations; and
  a multistage combiner responsive to said correlation unit and operative to combine respective groups of the correlations to provide respective intermediate combined values, and to combine the intermediate combined values in a manner that compensates for correlated impairment in the composite signal to estimate information in the transmitted spread spectrum signal,
  wherein said multistage combiner comprises:
  a first combiner responsive to said correlation unit and operative to combine a first group of the correlations to produce a first combined value;
  a second combiner responsive to said correlation unit and operative to combine a second group of the correlations to produce a second combined value; and
  a third combiner responsive to said first combiner and to said second combiner and operative to combine the first and second combined values in a manner that compensates for correlated impairment in the composite signal to generate an estimate information in the transmitted spread spectrum signal, wherein said third combiner is operative to combine the first and second combined values based on an estimated impairment correlation and on a composite channel response that reflects effects of said first and second combiners.

20. An apparatus according to claim 19:
  wherein said first combiner is operative to combine the first group of correlations in a manner that compensates for effect of a channel over which the spread spectrum signal is received; and
  wherein said second combiner is operative to combine the second group of correlations in a manner that compensates for effect of a channel over which the spread spectrum signal is received.

21. An apparatus according to claim 20:
  wherein said first combiner is operative to combine the first group of correlations according to estimated channel coefficients; and
  wherein said second combiner is operative to combine the second group of correlations according to estimated channel coefficients.

22. An apparatus according to claim 21, further comprising a channel estimator operative to generate the channel coefficient estimates.

23. An apparatus according to claim 22, wherein said channel estimator is operative to generate the channel coefficient estimates from at least one of a pilot channel, a pilot symbol or a decoded symbol.

24. An apparatus according to claim 19, further comprising:
  a composite channel response estimator operative to estimate the composite channel response;
  an impairment correlation estimator operative to estimate the impairment correlation; and
  a weighting factor estimator responsive to said composite channel response estimator and to said impairment correlation estimator and operative to generate weighting factors from the estimated composite channel response and the estimated impairment correlation; and
  wherein said third combiner is operative to combine the first and second combined values according to the generated weighting factors.

25. An apparatus according to claim 24, wherein said weighting factor estimator is operative to iteratively generate weighting factors from the estimated composite channel response, the estimated impairment correlation, and previously determined weighting factors.

26. An apparatus according to claim 19, wherein said third combiner is operative to combine the first and second values according to weighting factors to generate a third combined value, and further comprising an adaptive weighting factor estimator operative to adaptively estimate weighting factors based on comparison of the third combined value to a reference value.

27. An apparatus according to claim 19, wherein said correlation unit comprises at least one of a plurality of integrate and dump correlators, a sliding correlator, or a selectively inhibited sliding correlator.

28. An apparatus according to claim 19, wherein said correlation unit is operative to correlate the composite signal with the spreading sequence using a set of time delays that optimizes a metric that is proportional to a product of the weighting factors and the composite channel response.

29. An apparatus for recovering information encoded in a spread spectrum signal transmitted in a communications medium, the apparatus comprising:
   means for receiving a composite signal including a spread spectrum signal from the communications medium;
   means, responsive to said means for receiving, for correlating the composite signal with a spreading sequence to generate time-offset correlations;
   means, responsive to said means for correlating, for combining a first group of the correlations to produce a first combined value;
   means, responsive to said means for correlating, for combining a second group of the correlations to produce a second combined value; and
   means, responsive to said means for combining a first group and to said means for combining a second group, for combining the first and second combined values in a manner that compensates for correlated impairment in the composite signal to generate an estimate information in the transmitted spread spectrum signal,
   wherein said means for combining the first and second combined values comprises means for combining the first and second values based on an estimated impairment correlation and on a composite channel response that reflects said means for combining the first group correlations and said means for combining the second group of correlations.

30. An apparatus according to claim 29, further comprising:
   means for estimating the composite channel response;
   means for estimating the impairment correlation; and
   means for generating weighting factors from the estimated composite channel response and the estimated impairment correlation; and
   wherein said means for combining the first and second combined values comprises means for combining the first and second combined values according to the generated weighting factors.

31. An apparatus according to claim 30, wherein said means for generating weighting factors comprises means for iteratively generating weighting factors from the estimated composite channel response, the estimated impairment correlation, and previously determined weighting factors.

32. An apparatus according to claim 29:
   wherein said means for combining a first group of the correlations comprises means for combining the first group of correlations in a manner that compensates for effect of a channel over which the spread spectrum signal is received; and
   wherein said means for combining a second group of the correlations comprises means for combining the second group of correlations in a manner, that compensates for effect of a channel over which the spread spectrum signal is received.

33. An apparatus according to claim 32:
   wherein said means for combining a first group of the correlations comprises means for combining the first group of correlations according to estimated channel coefficients; and
   wherein said means for combing a second group of the correlations comprises means for combining the second group of correlations according to estimated channel coefficients.

34. An apparatus according to claim 33, further comprising means for generating the channel coefficient estimates.

35. An apparatus according to claim 34, wherein said means for generating the channel coefficient estimates comprises means for generating the channel coefficient estimates from at least one of a pilot channel, a pilot symbol or a decoded symbol.

36. An apparatus according to claim 29, wherein said means for correlating comprises at least one of a plurality of integrate and dump correlators, a sliding correlator, or a selectively inhibited sliding correlator.

37. An apparatus according to claim 29, wherein said means for correlating comprises means for correlating using a set of time delays that optimizes a metric that is proportional to a product of the weighting factors and the composite channel response.

38. An apparatus for recovering information encoded in a spread spectrum signal transmitted in a communications medium, the apparatus comprising:
   means for receiving a composite signal including a spread spectrum signal from the communications medium;
   means, responsive to said means for receiving, for correlating the composite signal with a spreading sequence to generate time-offset correlations;
   means, responsive to said means for correlating, for combining a first group of the correlations to produce a first combined value;
   means, responsive to said means for correlating, for combining a second group of the correlations to produce a second combined value; and
   means, responsive to said means for combining a first group and to said means for combining a second group, for combining the first and second combined values in a manner that compensates for correlated impairment in the composite signal to generate an estimate information in the transmitted spread spectrum signal,
   wherein said means for combining the first and second combined values comprises means for combining the first and second values according to weighting factors to generate a third combined value, and further comprising means for adaptively estimating weighting factors based on comparison of the third combined value to a reference value.

39. An apparatus for recovering information encoded in a spread spectrum signal transmitted in a communications medium, the apparatus comprising:
   means for receiving a composite signal including a spread spectrum signal from the communications medium;
   means, responsive to said means for receiving, for correlating the received composite signal with a spreading sequence to generate a plurality of time-offset correlations;
   means, responsive to said means for correlating, for combining a first group of the correlations according to a channel estimate to produce a first combined value;
   means, responsive to said means for correlating, for combining a second group of the correlations according to a channel estimate to produce a second combined value; and
   means, responsive to said means for combining a first group and to said means for combining a second group, for combining the first and second combined values according to weighting factors that compensate for correlated impairment in the composite signal to generate an estimate of information in the transmitted spread spectrum signal, wherein said means for combining the first and second combined values comprises means for combining the first and second combined values based on an estimated impairment correlation and on a composite channel response that reflects said means for combining the first group of correlations and said means for combining the second group of correlations.

40. An apparatus according to claim 39, further comprising:

means for estimating the composite channel response;

means for estimating the impairment correlation; and means for generating weighting factors from the estimated composite channel response and the estimated impairment correlation; and wherein said means for combining the first and second combined values comprises means for combining the first and second combined values according to the generated weighting factors.

41. An apparatus according to claim 40, wherein said means for generating weighting factors comprises means for iteratively generating weighting factors from the estimated composite channel response, the estimated impairment correlation, and previously determined weighting factors.

42. An apparatus according to claim 39, further comprising means for generating the channel estimate.

43. An apparatus according to claim 39, wherein said means for generating a channel estimate comprises means for generating the channel estimate from at least one of a pilot channel, a pilot symbol or a decoded symbol.

44. An apparatus according to claim 43, wherein said means for correlating comprises at least one of a plurality of integrate and dump correlators, a sliding correlator, or a selectively inhibited sliding correlator.

45. An apparatus according to claim 39, wherein said means for correlating comprises means for correlating using a set of time delays that optimizes a metric that is proportional to a product of the weighting factors and the composite channel response.

46. An apparatus for recovering information encoded in a spread spectrum signal transmitted in a communications medium, the apparatus comprising:

means for receiving a composite signal including a spread spectrum signal from the communications medium;

means, responsive to said means for receiving, for correlating the received composite signal with a spreading sequence to generate a plurality of time-offset correlations;

means, responsive to said means for correlating, for combining a first group of the correlations according to a channel estimate to produce a first combined value;

means, responsive to said means for correlating, for combining a second group of the correlations according to a channel estimate to produce a second combined value, and means, responsive to said means for combining a first group and to said means for combining a second group, for combining the first and second combined values according to weighting factors that compensate for correlated impairment in the composite signal to generate an estimate of information in the transmitted spread spectrum signal, wherein said means for combining the first and second combined values comprises means for combining the first and second values to generate a third combined value, and further comprising means for adaptively estimating weighting factors based on comparison of the third combined value to a reference value.

* * * * *

UNITED STATES PATENT AND TRADEMARK OFFICE
CERTIFICATE OF CORRECTION

PATENT NO. : 6,801,565 B1
DATED : October 5, 2004
INVENTOR(S) : Bottomley et al.

It is certified that error appears in the above-identified patent and that said Letters Patent is hereby corrected as shown below:

Title page,
Item [56], References Cited, U.S. PATENT DOCUMENTS, insert
-- 5,673,291             9/1997        Dent            375/262
   5,572,552             11/1996       Dent et al.     375/343
   6,363,104 (listed 09/165,647) 3/2002    Bottomley    375/148 --

Column 17,
Line 63, change "herein" to -- wherein --.

Signed and Sealed this

Eleventh Day of January, 2005

JON W. DUDAS
*Director of the United States Patent and Trademark Office*